(12) United States Patent
Yamada et al.

(10) Patent No.: US 11,039,442 B2
(45) Date of Patent: Jun. 15, 2021

(54) APPARATUS AND METHODS FOR CARRIER AGGREGATION USING RADIO RESOURCE CONTROL SIGNALING

(71) Applicant: SHARP KABUSHIKI KAISHA, Osaka (JP)

(72) Inventors: Shohei Yamada, Osaka (JP); Katsunari Uemura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/922,763

(22) Filed: Jul. 7, 2020

(65) Prior Publication Data

US 2020/0337053 A1 Oct. 22, 2020

Related U.S. Application Data

(60) Continuation of application No. 15/812,521, filed on Nov. 14, 2017, now Pat. No. 10,736,104, which is a
(Continued)

(30) Foreign Application Priority Data

Oct. 22, 2008 (JP) .................................. 2008-272048

(51) Int. Cl.
*H04W 72/04* (2009.01)
*H04W 76/27* (2018.01)
(Continued)

(52) U.S. Cl.
CPC ......... *H04W 72/0453* (2013.01); *H04L 5/001* (2013.01); *H04L 5/003* (2013.01);
(Continued)

(58) Field of Classification Search
CPC . H04W 72/0453; H04W 72/02; H04W 48/12; H04W 76/27; H04W 72/042;
(Continued)

(56) References Cited

U.S. PATENT DOCUMENTS 6,628,946 B1 9/2003 Wiberg et al.
6,650,629 B1 11/2003 Takahashi et al.
(Continued)

FOREIGN PATENT DOCUMENTS

CN 101123818 A 2/2008
CN 100421365 C 9/2008
(Continued)

OTHER PUBLICATIONS

"3rd Generation Partnership Project: Technical Specification Group Radio Access Network; Evolved Universal Terrestrial Radio Access (E-UTRA) Radio Resource Control (RRC); Protocol Specification (Release 8)", 3GPP TS 36.331 V8.2.0, May 2008, pp. 1-151.
(Continued)

*Primary Examiner* — Omar J Ghowrwal
(74) *Attorney, Agent, or Firm* — Birch, Stewart, Kolasch & Birch, LLP

(57) ABSTRACT

A communication system that includes a terminal apparatus and a base station apparatus. The terminal apparatus obtains, from the base station apparatus, information regarding addition of a component carrier, whereby the information regarding addition of the component carrier comprises information related to carrier frequency of the component carrier and information related to system bandwidth of the component carrier. The base station apparatus provides, to the terminal apparatus, information regarding addition of a component carrier, whereby the information regarding addition of the component carrier comprises information related to carrier
(Continued)

frequency of the component carrier and information related to system bandwidth of the component carrier.

4 Claims, 12 Drawing Sheets

Related U.S. Application Data continuation of application No. 14/887,911, filed on Oct. 20, 2015, now abandoned, which is a continuation of application No. 14/263,913, filed on Apr. 28, 2014, now Pat. No. 9,191,924, which is a continuation of application No. 13/952,553, filed on Jul. 26, 2013, now Pat. No. 8,743,757, which is a division of application No. 13/125,311, filed as application No. PCT/JP2009/063377 on Jul. 28, 2009, now Pat. No. 8,526,309.

(51) Int. Cl.
| | | |
|---|---|---|
| *H04W 48/10* | (2009.01) | |
| *H04W 72/02* | (2009.01) | |
| *H04L 5/00* | (2006.01) | |
| *H04W 48/12* | (2009.01) | |

(52) U.S. Cl.
CPC .......... *H04L 5/0064* (2013.01); *H04L 5/0098* (2013.01); *H04W 48/10* (2013.01); *H04W 48/12* (2013.01); *H04W 72/02* (2013.01); *H04W 72/042* (2013.01); *H04W 76/27* (2018.02); *H04L 5/0026* (2013.01); *H04L 5/0087* (2013.01)

(58) Field of Classification Search
CPC ...... H04W 48/10; H04L 5/001; H04L 5/0064; H04L 5/0098; H04L 5/0026; H04L 5/0087; H04L 5/003
See application file for complete search history.

(56) References Cited

U.S. PATENT DOCUMENTS

| | | | |
|---|---|---|---|
| 8,743,757 | B2 | 6/2014 | Yamada et al. |
| 9,191,924 | B2 * | 11/2015 | Yamada ............... H04L 5/0064 |
| 9,331,833 | B2 | 5/2016 | Tseng |
| 2003/0144003 | A1 | 7/2003 | Ranta et al. |
| 2005/0164719 | A1 | 7/2005 | Waters |
| 2006/0274712 | A1 | 12/2006 | Malladi et al. |
| 2007/0021122 | A1 | 1/2007 | Lane et al. |
| 2008/0039083 | A1 | 2/2008 | Muniere et al. |
| 2008/0227405 | A1 | 9/2008 | Harel et al. |
| 2008/0240107 | A1 | 10/2008 | Parekh et al. |
| 2008/0247375 | A1 | 10/2008 | Muharemovic et al. |
| 2009/0028112 | A1 | 1/2009 | Attar et al. |
| 2009/0046672 | A1 | 2/2009 | Malladi et al. |
| 2010/0227569 | A1 | 9/2010 | Bala et al. |
| 2010/0240385 | A1 | 9/2010 | Lohr et al. |
| 2010/0248753 | A1 | 9/2010 | Kwak et al. |
| 2010/0296410 | A1 | 11/2010 | Kazmi et al. |
| 2010/0323744 | A1 | 12/2010 | Kim et al. |
| 2011/0059767 | A1 | 3/2011 | Parkvall et al. |
| 2011/0081856 | A1 | 4/2011 | Johansson et al. |
| 2011/0261759 | A1 | 10/2011 | Yamada et al. |
| 2012/0002635 | A1 * | 1/2012 | Chung ................. H04L 5/0035 370/329 |

FOREIGN PATENT DOCUMENTS

| | | |
|---|---|---|
| JP | 2003-500950 A | 1/2003 |
| JP | 2005-204305 A | 7/2005 |
| JP | 2012-506674 A | 3/2012 |
| WO | WO 2006/116102 A2 | 11/2006 |
| WO | WO 2007/078172 A2 | 7/2007 |
| WO | WO 2007/108630 A1 | 9/2007 |
| WO | WO 2008/040448 A1 | 4/2008 |
| WO | WO 2010/047166 A1 | 4/2010 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V.8.4.0, Mar. 2008, pp. 1-126.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V.8.6.0, Sep. 2008, pp. 1-137.

"3rd Generation Partnership Project; Technical Specification Group Radio Access Network; Evolved Universal Terrestrial Radio Access (E-UTRA) Radio Resource Control (RCC); Protocol specification (Release 8)", 3GPP TS 36.331 V8.1.0, Mar. 2008, pp. 1-122.

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V.8.3.0, Sep. 2008; pp. 1-178.

3GPP TS 36.331 V8.3.0 (Sep. 2008), Technical Specification, 3rd Generation Partnership Project; Technical Specification Group Radio Access Network; Evolved Universal Terrestrial Radio Access (E-UTRA) Radio Resource Control (RRC); Protocol Specification (Release 8), 178 pages.

Eiko Seidel, "Progress on "LTE Advanced" —the new 4G standard", Jul. 24, 2008, pp. 1-3.

Ericsson, "Carrier Aggregation", TSG-RAN WG1 #54bis, Prague, Czech Republic, Sep. 29-Oct. 3, 2008, R1-083750, 4 pages.

Ericsson, "A discussion on some technology components for LTE-Advanced", TSG-RAN WG1 #53, R1-082024, May 5-9, 2008, 11 pages provided, Kansas City, MO, USA.

Extended European Search Report for Application No. 09821866.2 dated Jul. 20, 2012.

Michael Steve Stanley Laine, 3GPP LTE, May 1, 2008, University of Kansas, School of Engineering, pp. 1-39.

Nokia et al., "L1 control signaling with carrier aggregation in LTE-Advanced", 3GPP TSG-RAN WG1 Meeting #54bis, Prague, Czech Republic, Sep. 29-Oct. 3, 2008, R1-083730 (6 pages).

Rosa et al., "Performance of FastAMC in E-UTRAN Uplink", May 19-23, 2008, IEEE, pp. 1.5.

U.S. Notice of Allowance issued in U.S. Appl. No. 13/125,311 dated Apr. 26, 2013.

U.S. Notice of Allowance issued in U.S. Appl. No. 13/952,553 dated Jan. 27, 2014.

U.S. Notice of Allowance issued in U.S. Appl. No. 14/263,913 dated Jul. 13, 2015.

U.S. Notice of Allowance issued in U.S. Appl. No. 14/263,913 dated Mar. 13, 2015.

U.S. Office Action issued in U.S. Appl. No. 13/125,311 dated Jan. 16, 2013.

U.S. Office Action issued in U.S. Appl. No. 13/125,311 dated Jul. 5, 2012.

U.S. Office Action issued in U.S. Appl. No. 13/952,553 dated Aug. 26, 2013.

U.S. Office Action issued in U.S. Appl. No. 14/263,913 dated Oct. 8. 2014.

3GPP TSG RAN WG1 #53bis, Warsaw, Poland, Jun. 30-Jul. 4, 2008, "Carrier aggregation in Advanced E-UTRA" (4 pages).

3GPP TSG RAN WG1 Meeting #54, Jeju, Korea, Aug. 18-22, 2008, "Discussion of the LTE-Advanced only band" (2 pages).

Advisory Action issued in U.S. Appl. No. 14/887,911 dated Nov. 2, 2016.

Final Office Action issued in corresponding U.S. Appl. No. 15/812,521 dated Apr. 3, 2019.

Non-Final Office Action issued in corresponding U.S. Appl. No. 15/812,521 dated Feb. 22, 2018.

(56) References Cited

OTHER PUBLICATIONS

Non-Final Office Action issued in corresponding U.S. Appl. No. 15/812,521 dated Oct. 4, 2018.
Non-Final Office Action issued in corresponding U.S. Appl. No. 15/812,521 dated Sep. 16, 2019.
Notice of Allowance issued in corresponding U.S. Appl. No. 15/812,521 dated Mar. 25, 2020.
Supplemental Notice of Allowance issued in corresponding U.S. Appl. No. 15/812,521 dated Jun. 8, 2020.
U.S. Office Action issued in U.S. Appl. No. 14/887,911 dated Dec. 16, 2016.
U.S. Office Action issued in U.S. Appl. No. 14/887,911 dated Feb. 1, 2016.
U.S. Office Action issued in U.S. Appl. No. 14/887,911 dated Jun. 17, 2016.
U.S. Office Action issued in U.S. Appl. No. 14/887,911 dated May 15, 2017.
U.S. Appl. No. 61/162,340, ASUSTek Computer INC, filed Mar. 23, 2009, PALM, pp. 1-7 (Year 2009).

\* cited by examiner

APPARATUS AND METHODS FOR CARRIER AGGREGATION USING RADIO RESOURCE CONTROL SIGNALING

CROSS-REFERENCE TO RELATED APPLICATIONS

This application is a Continuation Application of co-pending application Ser. No. 15/812,521, filed Nov. 14, 2017, which is a Continuation Application of application Ser. No. 14/887,911, filed on Oct. 20, 2015 (now abandoned), which is a Continuation of application Ser. No. 14/263,913, filed on Apr. 28, 2014 (now U.S. Pat. No. 9,191,924, issued on Nov. 17, 2015), which is a Continuation Application of application Ser. No. 13/952,553, filed on Jul. 26, 2013 (now U.S. Pat. No. 8,743,757, issued on Jun. 3, 2014), which is a Divisional of application Ser. No. 13/125,311, filed on Jul. 15, 2011 (now U.S. Pat. No. 8,526,309, issued on Sep. 3, 2013), which is a National Phase of PCT/JP2009/063377 filed on Jul. 28, 2009, and for which priority is claimed under 35 U.S.C. § 120; and these applications claim priority of Application No. JP2008-272048 filed in Japan on Oct. 22, 2008 under 35 U.S.C. § 119; the entire contents of all are hereby incorporated by reference.

TECHNICAL FIELD

The present invention relates to a mobile communication system, a mobile station apparatus, a base station apparatus, method for managing a mobile station apparatus, method for managing a base station apparatus and a processing section and more particularly, to a mobile communication system having a plurality of component carriers present therein and a mobile station apparatus, a base station apparatus, method for managing a mobile station apparatus, method for managing a base station apparatus and a processing section used in the communication system.

BACKGROUND ART

"3GPP (3rd Generation Partnership Project)" is a project that studies and creates a specification of a portable telephone system that is based on a network formed by developing W-CDMA (Wideband-Code Division Multiple Access) and GSM (Global System for Mobile Communications).

In 3GPP, a W-CDMA scheme is standardized as a third generation cellular mobile communication system and its services are being sequentially started. HSDPA (High-Speed Downlink Packet Access) whose communication speed is further increased is also standardized and its services are also being started.

In 3GPP, consideration is advancing on a mobile communication system (hereinafter, referred to as "LTE-A (Long Term Evolution-Advanced)" or "Advanced-EUTRA") that realizes transmission and reception of data at a further higher speed by utilizing the evolution of the third generation wireless access technology (referred to as "LTE (Long Term Evolution) or EUTRA (Evolved Universal Terrestrial Radio Access)) and a system bandwidth that is further wider.

An OFDMA (Orthogonal Frequency Division Multiple Access) system has been proposed that executes multiplexes users using subcarriers that are orthogonal to each other, as a downlink communication system in EUTRA.

The OFDMA system employs techniques such as an adaptive modulation/demodulation and error correction scheme (AMCS: Adaptive Modulation and Coding Scheme) that is based on adaptive radio link control (Link Adaptation) such as channel coding.

"AMCS" is a scheme that switches between wireless transmission parameters (also referred to as "AMC mode") such as an error-correcting system, the coding rate of the error correction, and the data modulation multiple-value number due to the channel quality of each mobile station apparatus in order to efficiently execute a high speed packet data transmission.

The channel quality of each mobile station apparatus is fed back to a base station apparatus using CQI (Channel Quality Indicator).

FIG. 12 is a diagram of the channel configuration that is used in a conventional wireless communication system. The channel configuration is used in a wireless communication system such as EUTRA (see Non-Patent Literature 1). The wireless communication system depicted in FIG. 12 includes a base station apparatus 100 and mobile station apparatuses 200a, 200b, and 200c. "R01" denotes the coverage area of the base station apparatus 100 and the base station apparatus 100 communicates with the mobile station apparatuses that are present in the coverage R01.

In EUTRA, in a downlink to transmit a signal from the base station apparatus 100 to the mobile station apparatuses 200a to 200c, a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH) are used.

In EUTRA, in an uplink to transmit a signal from the mobile station apparatuses 200a to 200c to the base station apparatus 100, a physical uplink shared channel (PUSCH), a physical uplink control channel (PUCCH), and a physical random access channel (PRACH) are used.

LTE-A is based on the basic system of EUTRA. The frequency band used in a common system is continuous. In contrast, it has been proposed in LTE-A to operate a system by using a plurality of continuous or non-continuous frequency bands (hereinafter, "carrier component" or "component carrier (CC)") multi-functionally as one wide frequency band (a system band having a wide band) that is called, spectrum aggregation or carrier aggregation. One system band is configured by a plurality of component carriers each of which has a part of a band width of the system band that is an available frequency band. A mobile station apparatus of LTE or LTE-A can operate in each of the component carriers. It has been proposed that a frequency band used in downlink communication and a frequency band used in uplink communication have a different frequency bandwidth, respectively to more flexibly use the frequency band that is allocated to the mobile communication system.

PRIOR ART DOCUMENT—NON-PATENT LITERATURE

Non-Patent Literature 1: 3GPP TS (Technical Specification) 36.300, V8.4.0 (2008 March), 3rd Generation Partnership Project; Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

DISCLOSURE OF THE INVENTION

Problems to be Solved by the Invention

However, in a wireless communication system that has conventionally been known, a problem has existed that it is highly inefficient for a mobile station apparatus to have wireless apparatuses that fully correspond to the number of component carriers up to the upper layer.

The present invention was conceived in view of the above circumstances and the object thereof is to provide a mobile communication system and a mobile station apparatus, a base station apparatus, method for managing a mobile station apparatus, method for managing a base station apparatus and a processing section that can efficiently manage setting information retained by a base station apparatus and a mobile station apparatus and that can execute communication quickly in a system where a plurality of component carriers present.

Means for Solving the Problems

A first technical means of the present invention is a mobile communication system including a base station apparatus and a mobile station apparatus, wherein specific system information elements used for each of a plurality of component carriers having a part of a bandwidth of a system band is managed as specific information in each of component carriers.

A second technical means is the mobile communication system of the first technical means, wherein the specific system information elements used for each of the plurality of component carriers that has the section of the bandwidth of the system band is managed as common information in each of the plurality of component carriers.

A third technical means is the mobile communication system of the first technical means, wherein the system information elements that are specific in each of the plurality of component carriers is separately managed for each of an uplink and a downlink.

A fourth technical means is the mobile communication system of the first technical means, comprising radio resource control signaling to notify of the system information elements that are specific in each of the plurality of component carriers.

A fifth technical means is a mobile communication system, wherein paging is used for a notify of updating of the system information elements of a first component carrier, and system information elements of a second component carrier are updated using radio resource control signaling.

A sixth technical means is the mobile communication system as defined in the fifth technical means, wherein a mobile station apparatus determines whether to update system information elements of the first component carrier by examining a value tag that is informed in the first component carrier.

A seventh technical means is the mobile communication system as defined in the fifth technical means, wherein system information elements of the first and second component carriers are managed by classifying into information specific to each of the component carriers and information common to a plurality of component carriers.

An eighth technical means is a mobile station apparatus in a mobile communication system including a base station apparatus and the mobile station apparatus, wherein system information elements concerning a plurality of component carriers are managed being classified into information specific to each of the component carriers and information common to a plurality of component carriers.

A ninth technical means is the mobile station apparatus as defined in the eighth technical means, wherein the mobile station apparatus acquires the system information elements that are specific to the component carrier from radio resource control signaling.

A tenth technical means is a mobile station apparatus in a mobile communication system including a base station apparatus and the mobile station apparatus, comprising: a first component carrier that receives paging; and a second component carrier that does not receive the paging, wherein system information elements concerning the first and the second component carriers are managed being classified into information specific to each of the component carriers and information common to a plurality of component carriers.

An eleventh technical means is the mobile station apparatus as defined in the tenth technical means, wherein the mobile station apparatus acquires the system information elements that are specific to the component carrier from radio resource signaling.

A twelfth technical means is a mobile station apparatus, obtaining a notice of updating of system information elements of a first component carrier from paging and updating system information elements of a second component carrier by obtaining from radio resource control signaling.

A thirteenth technical means is the mobile station apparatus as defined in the twelfth technical means, wherein the mobile station apparatus determines whether to update system information elements of the first component carrier by examining a value tag that is informed in the first component carrier.

A fourteenth technical means is the mobile station apparatus as defined in the twelfth technical means, wherein system information elements of the first and second component carriers are managed by classifying into information specific to each of the component carriers and information common to a plurality of component carriers.

A fifteenth technical means is a base station apparatus in a mobile communication system including the base station apparatus and a mobile station apparatus, wherein system information elements concerning a plurality of component carriers are managed being classified into information specific to each of the component carriers and information common to a plurality of component carriers.

A sixteenth technical means is the base station apparatus as defined in the fifteenth technical means, wherein the base station apparatus notifies of the system information elements that are specific to the component carrier using radio resource control signaling.

A seventeenth technical means is a base station apparatus in a mobile communication system including the base station apparatus and a mobile station apparatus, comprising: a first component carrier that receives paging; and a second component carrier that does not receive the paging, wherein system information elements concerning the first and the second component carriers are managed being classified into information that is specific to each of the component carriers and information that is common to a plurality of component carriers.

An eighteenth technical means is a base station apparatus as defined in the seventeenth technical means, wherein the base station apparatus notifies of the system information elements that are specific to each of the component carriers using radio resource control signaling.

A nineteenth technical means is a base station apparatus, wherein paging is used for a notify of updating of system information elements of a first component carrier, and system information elements of a second component carrier are updated using radio resource signaling.

A twentieth technical means is the base station apparatus as defined in the nineteenth technical means, causing mobile station apparatus to examine a value tag that is informed in the first component carrier and thereby to determine whether to update system information components of the first component carrier.

A twenty-first technical means is the base station apparatus as defined in the nineteenth technical means, wherein system information elements of the first and second component carriers are managed by classifying into information specific to each of the component carriers and information common to a plurality of component carriers.

A twenty-second technical means is a method for managing mobile station apparatuses in a mobile communication system comprising a base station apparatus and a mobile station apparatus, wherein system information elements of a plurality of component carriers are managed by classifying into information specific to each of the component carriers and information common to a plurality of component carriers.

A twenty-third technical means is the method for managing as defined in the twenty-second technical means, wherein the mobile station apparatus acquires the system information elements that are specific to the component carrier from radio resource control signaling.

A twenty-fourth technical means is a method for managing mobile station apparatuses in a mobile communication system comprising a base station apparatus and a mobile station apparatus, comprising: a first component carrier that receives paging; and a second component carrier that does not receive the paging, wherein system information elements concerning the first and the second component carriers are managed being classified into information specific to each of the component carriers and information common to a plurality of component carriers.

A twenty-fifth technical means is the method for managing as defined in the twenty-fourth technical means, wherein the mobile station apparatus acquires the system information elements that are specific to the component carrier from radio resource control signaling.

A twenty-sixth technical means is a method for managing, wherein a mobile station apparatus obtains a notice of updating of system information elements of a first component carrier from paging and updates system information elements of a second component carrier obtained from radio resource control signaling.

A twenty-seventh technical means is the method for managing as defined in the twenty-sixth technical means, wherein the mobile station apparatus determines whether to update system information elements of the first component carrier by examining a value tag that is informed in the first component carrier.

A twenty-eight technical means is the method for managing as defined in the twenty-sixth technical means, wherein system information elements of the first and second component carriers is managed by classifying into information specific to each of the component carriers and information common to a plurality of component carriers.

A twenty-ninth technical means is a method for managing a base station apparatus in a mobile communication system comprising a base station apparatus and mobile station apparatuses, wherein system information elements of a plurality of component carriers are managed by classifying into information specific to each of the component carriers and information common to a plurality of component carriers.

A thirtieth technical means is the method for managing as defined in the twenty-ninth technical means, wherein the base station apparatus notifies of the system information elements that are specific to the component carrier using radio resource control signaling.

A thirty-first technical means is a method for managing a base station apparatus in a mobile communication system comprising a base station apparatus and mobile station apparatuses, comprising a first component carrier that receives paging and a second component carrier that does not receive the paging, wherein system information elements concerning the first and the second component carriers are managed being classified into information that is specific to each of the component carriers and information that is common to a plurality of component carriers.

A thirty-second technical means is the method for managing as defined in the thirty-first technical means, wherein the base station apparatus notifies of the system information elements that are specific to the component carrier using radio resource control signaling.

A thirty-third technical means is a method for managing, wherein a base station apparatus uses paging to notify of updating of system information elements of a first component carrier, and updates system information elements of a second component carrier using radio resource control signaling.

A thirty-fourth technical means is the method for managing as defined in the thirty-third technical means, causing a mobile station apparatus to examine a value tag that is informed in the first component carrier and thereby to determine whether to update system information components of the first component carrier.

A thirty-fifth technical means is the method for managing as defined in the thirty-third technical means, wherein system information elements of the first and second component carriers are managed by classifying into information specific to each of the component carriers and information common to a plurality of component carriers.

A thirty-sixth technical means is a processing section executing any one of the methods for managing as defined in the twenty-second to twenty-eighth technical means, wherein the method is executed by a plurality of processing blocks and an upper block which collectively controls a plurality of the processing blocks.

A thirty-seventh technical means is a processing section executing any one of the methods for managing as defined in the twenty-ninth to thirty-fifth technical means, wherein the method is executed by a plurality of processing blocks and an upper block which collectively controls a plurality of the processing blocks.

Effect of the Invention

The mobile communication system, the mobile station apparatus, the base station apparatus, the method for managing a mobile station apparatus, the method for managing a base station apparatus and the processing section of the present invention can efficiently manage setting information retained by a base station apparatus and a mobile station apparatus and can execute communication quickly in a system that has a plurality of component carriers present therein.

BEST MODES FOR CARRYING OUT THE INVENTION

Embodiments of the present invention will be described with reference to the accompanying drawings.

A first embodiment of the present invention will be described. A wireless communication system according to the first embodiment of the present invention includes one or more base station apparatuses and one or more mobile station apparatuses, and executes wireless communication therebetween. One base station apparatus configures one or more cells and one cell can hold one or more mobile station apparatuses.

Figure 1:
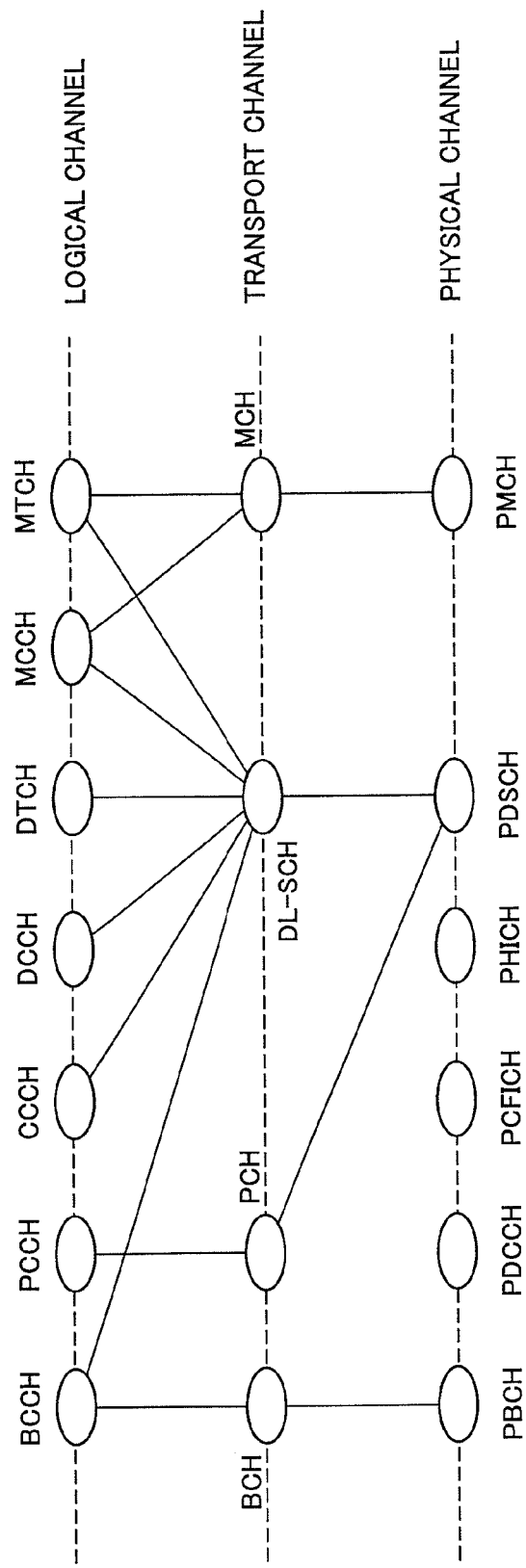
FIG. 1 is a diagram of the channel configuration of a downlink that is used in a communication system according to a first embodiment of the present invention.
Figure 2:
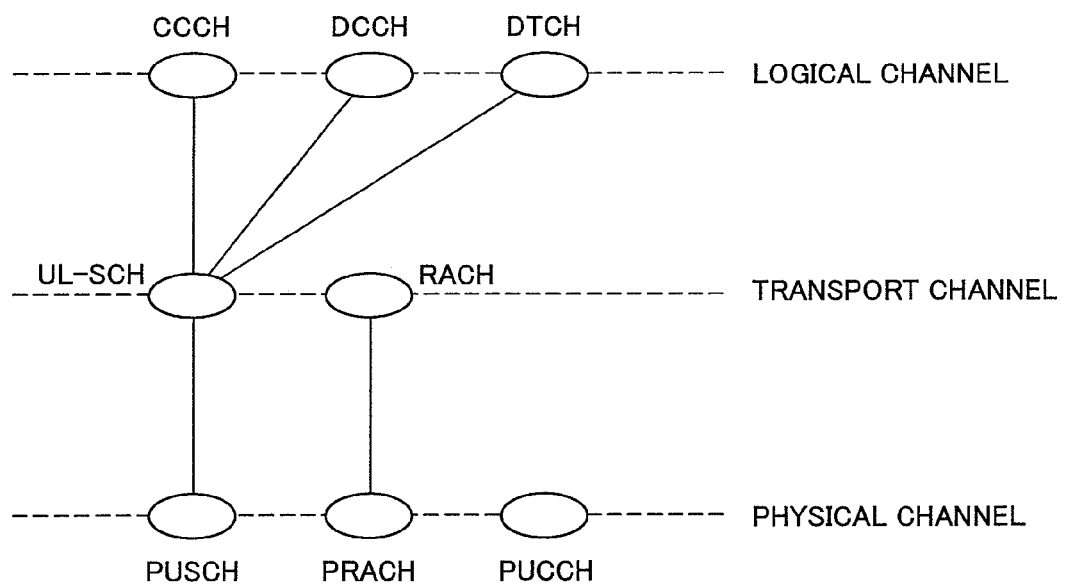
FIG. 2 is a diagram of the channel configuration of an uplink that is used in the communication system according to the first embodiment of the present invention.

FIG. 1 is a diagram of the channel configuration of a downlink that is used in the communication system according to the first embodiment of the present invention. FIG. 2 is a diagram of the channel configuration of an uplink that is used in the communication system according to the first embodiment of the present invention. A channel of the downlink depicted in FIG. 1 and a channel of the uplink depicted in FIG. 2 are configured by a logical channel, a transport channel, and a physical channel, respectively.

The logical channel defines the kind of data transmission service that is transmitted and received in a medium access control (MAC) layer. The transport channel defines what property data transmitted by a wireless interface has and how the data is transmitted. The physical channel is a physical channel that conveys the transport channel.

The logical channel of the downlink includes a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH). The logical channel of the uplink includes a common control channel (CCCH), a dedicated control channel (DCCH), and a dedicated traffic channel (DTCH).

The transport channel of the downlink includes a broadcast channel (BCH), a paging channel (PCH), a downlink shared channel (DL-SCH), and a multicast channel (MCH). The transport channel of the uplink includes an uplink shared channel (UL-SCH) and a random access channel (RACH).

The physical channel of the downlink includes a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). The physical channel of the uplink includes a physical uplink shared channel (PUSCH), a physical random access channel (PRACH), and a physical uplink control channel (PUCCH).

Figure 7:
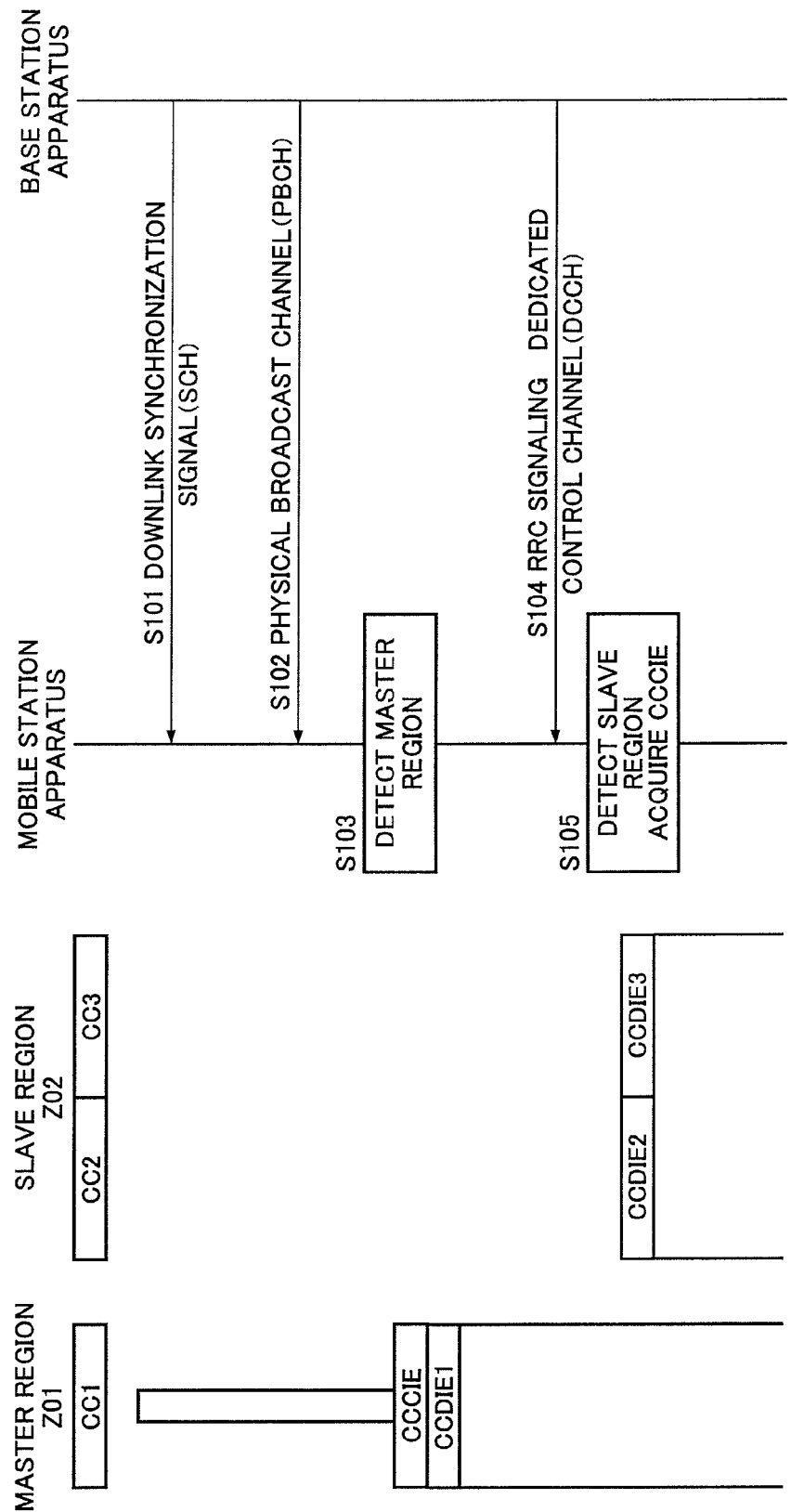
FIG. 7 is a sequence chart showing processing in the wireless communication system according to the first embodiment of the present invention.

These channels are transmitted and received between the base station apparatus(es) and the mobile station apparatus(es) as depicted in FIG. 7 as described for the conventional technique.

The logical channel will be described. The broadcast control channel (BCCH) is a downlink channel that is used to broadcast system control information. The paging control channel (PCCH) is a downlink channel that is used to transmit paging information, and is used when the network does not know the position of a mobile station apparatus in the cell.

The common control channel (CCCH) is a channel that is used to transmit control information between the mobile station apparatus and the network, and is used by a mobile station apparatus that has no radio resource control (RRC) connection with the network.

The dedicated control channel (DCCH) is a bidirectional point-to-point channel and is used to transmit individual control information between the mobile station apparatus and the network. The dedicated control channel (DCCH) is used by a mobile station apparatus that has a RRC connection.

The dedicated traffic channel (DTCH) is a bidirectional point-to-point channel, is a channel dedicated to one mobile station apparatus, and is used to transfer user information (unicast data).

The multicast control channel (MCCH) is a downlink channel that is used to execute point-to-multipoint transmission of MBMS (Multimedia Broadcast Multicast Service) control information from the network to the mobile station apparatus. This is used for the MBMS service that provides point-to-multipoint services.

A transmission method of the MBMS services includes single-cell point-to-multipoint (SCPTM) transmission and multimedia broadcast multicast service single frequency network (MBSFN) transmission.

"MBSFN transmission" is a simultaneous transmission technique that is realized by simultaneously transmitting identifiable waveforms (signals) from a plurality of cells. On the other hand, "SCPTM transmission" is a method for transmitting the MBMS service by one base station apparatus.

The multicast control channel (MCCH) is used for one or a plurality of multicast traffic channels (MTCH). The multicast traffic channel (MTCH) is a downlink channel that is used to execute point-to-multipoint transmission of traffic data (MBMS transmission data) from the network to the mobile station apparatuses.

The multicast control channel (MCCH) and the multicast traffic channel (MTCH) are used only by mobile station apparatuses that receive the MBMS.

The transport channel will be described. The broadcast channel (BCH) is broadcasted to the whole cell in a transmission scheme that is fixed and defined in advance. On the downlink shared channel (DL-SCH), it is necessary that HARQ (Hybrid Automatic Repeat Request), dynamic adaptive radio link control, discontinuous reception (DRX), and MBMS transmission are supported and broadcast to the whole cell.

On the downlink shared channel (DL-SCH), beam forming is available, and dynamic resource allocation and sub-static resource allocation are supported. On the paging channel (PCH), it is necessary that DRX is supported and broadcast to the whole cell.

The paging channel (PCH) is mapped on a physical resource that is dynamically used for the traffic channel and other control channels, namely, the physical downlink shared channel (PDSCH).

The multicast channel (MCH) needs to be broadcast to the whole cell. On the multicast channel (MCH), the quasi-static resource allocation is supported such as MBSFN (MBMS Single Frequency Network) combining of the MBMS transmission from a plurality of cells and a time frame that uses expanded cyclic prefix (CP).

On the uplink shared channel (UL-SCH), HARQ, and the dynamic adaptive radio link control are supported. On the uplink shared [channel (UL-SCH), beam forming is available, and the dynamic resource allocation and the quasi-static resource allocation are supported. On the random access channel (RACH), limited control information is transmitted and a risk of collision is present.

The physical channels will be described. The physical broadcast channel (PBCH) maps the broadcast channel (BCH) at 40-millisecond intervals. The timing of 40 milliseconds is blind-detected. That is, no explicit signaling needs to be executed to present the timing. A sub-frame that includes the physical broadcast channel (PBCH) can be decoded by the sub-frame alone (that is, self-decodable).

The physical downlink control channel (PDCCH) is a channel that is used to notify the mobile station apparatus of resource allocation for the downlink shared channel (PDSCH), hybrid automatic repeat request (HARQ) information for downlink data, and an uplink transmission permission (uplink grant) that is the resource allocation for the physical uplink shared channel (PUSCH).

The physical downlink shared channel (PDSCH) is a channel that is used to transmit downlink data or paging information. The physical multicast channel (PMCH) is a channel that is used to transmit the multicast channel (MCH), and is provided with a downlink reference signal, an uplink reference signal, and a physical downlink synchronization signal, separately.

The physical uplink shared channel (PUSCH) is a channel that is used to mainly transmit uplink data (UL-SCH). When the base station apparatus 100 schedules for the mobile station apparatus 200, a channel feedback report (a channel quality indicator "CQI", a pre-coding matrix indicator "PMI", and a rank indicator "RI" for the downlink) and a HARQ acknowledgment (ACK: Acknowledgment/NACK: negative acknowledgment) to downlink transmission are also transmitted using the physical uplink shared channel (PUSCH).

The physical random access channel (PRACH) is a channel that is used to transmit a random access preamble and has a guard time. The physical uplink control channel (PUCCH) is a channel that is used to transmit the channel feedback report (CQI, PMI, and RI), a scheduling request (SR), a HARQ for downlink transmission, an acknowledgment/negative acknowledgment, etc.

The physical control format indicator channel (PCFICH) is a channel that is used to notify the mobile station apparatuses of the number of OFDM symbols that are used for the physical downlink control channel (PDCCH), and is transmitted in each sub-frame.

The physical hybrid automatic repeat request indicator channel (PHICH) is a channel that is used to transmit the HARQ ACK/NACK to the uplink transmission.

Channel mapping by the communication system according to the first embodiment of the present invention will be described.

As depicted in FIG. 1, in a downlink, mapping of the transport channel and that of the physical channel are executed as follows. The broadcast channel (BCH) is mapped onto the physical broadcast channel (PBCH).

The multicast channel (MCH) is mapped onto the physical multicast channel (PMCH). The paging channel (PCH) and the downlink shared channel (DL-SCH) are mapped onto the physical downlink shared channel (PDSCH).

The physical downlink control channel (PDCCH), the physical hybrid automatic repeat request indicator channel (PHICH), and the physical control format indicator channel (PCFICH) are used as a physical channel alone.

On the other hand, in the uplink, mapping of the transport channel and that of the physical channel are executed as described below. The uplink shared channel (UL-SCH) is mapped onto the physical uplink shared channel (PUSCH).

The random access channel (RACH) is mapped onto the physical random access channel (PRACH). The physical uplink control channel (PUCCH) is used as a physical channel alone.

In the downlink, mapping of the logical channel and that of the transport channel are executed as described below. The paging control channel (PCCH) is mapped onto the paging channel (PCH).

The broadcast control channel (BCCH) is mapped onto the broadcast channel (BCH) and the downlink shared channel (DL-SCH). The common control channel (CCCH), the dedicated control channel (DCCH), and the dedicated traffic channel (DTCH) are mapped onto the downlink shared channel (DL-SCH).

The multicast control channel (MCCH) is mapped onto the downlink shared channel (DL-SCH) and the multicast channel (MCH). The multicast traffic channel (MTCH) is mapped onto the downlink shared channel (DL-SCH) and the multicast channel (MCH).

The mapping from the multicast control channel (MCCH) and the multicast traffic channel (MTCH) to the multicast channel (MCH) is executed when the MBSFN is transmitted. On the other hand, this mapping is mapped onto the downlink shared channel (DL-SCH) when the SCPTM is transmitted.

On the other hand, in the uplink, mapping of the logical channel and that of the transport channel are executed as described below. The common control channel (CCCH), the dedicated control channel (DCCH), and the dedicated traffic channel (DTCH) are mapped onto the uplink shared channel (UL-SCH). The random access channel (RACH) is not mapped with any logical channel.

The configuration of a frame that is used in the wireless communication system according to the first embodiment of the present invention will be described.

Figure 3:
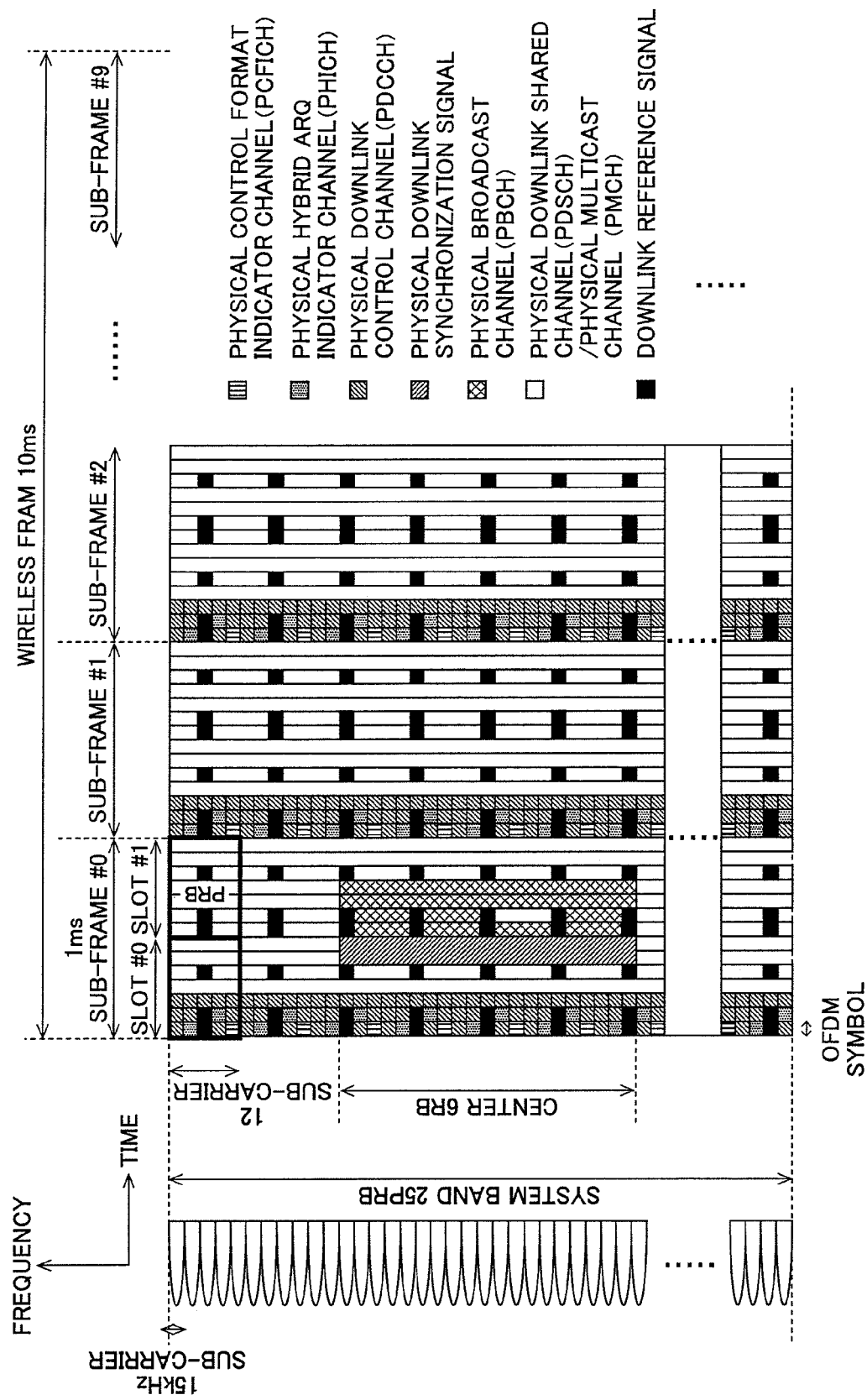
FIG. 3 is a diagram of the frame configuration that is used in the downlink of the communication system according to the first embodiment of the present invention.
Figure 4:
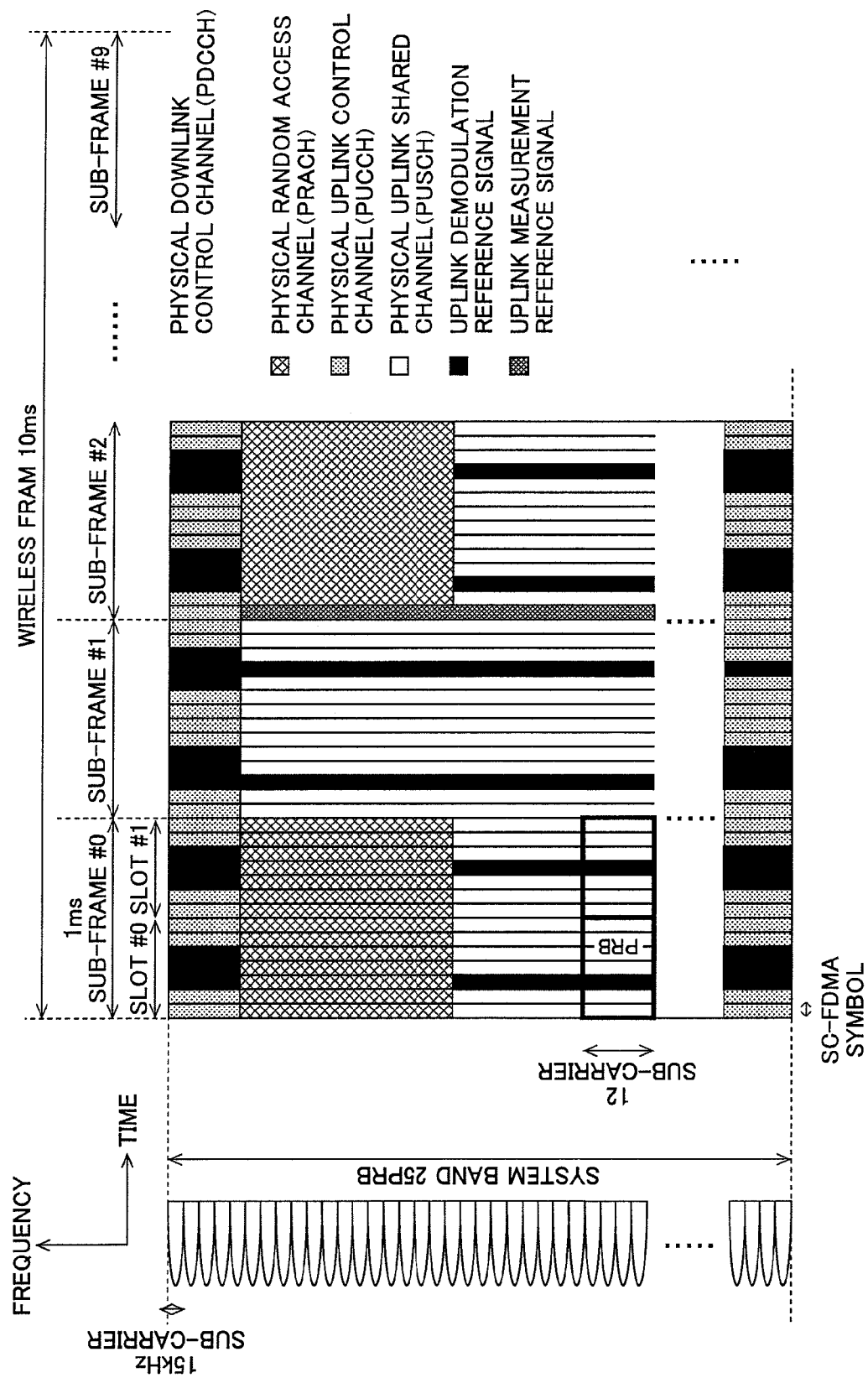
FIG. 4 is a diagram of the frame configuration that is used in the uplink of the communication system according to the first embodiment of the present invention.

FIG. 3 is a diagram of the frame configuration that is used in the downlink of the communication system according to the first embodiment of the present invention. FIG. 4 is a diagram of the frame configuration that is used in the uplink of the communication system according to the first embodiment of the present invention. In each of FIGS. 3 and 4, the axis of abscissa represents the time and the axis of ordinate represents the frequency.

A wireless frame that is identified by a system frame number (SFN) is configured by 10 milliseconds (10 msec). One sub-frame is configured by one millisecond (one msec). A wireless frame includes 10 sub-frames #F0 to "F9.

As depicted in FIG. 3, the physical control format indicator channel (PCFICH), the physical hybrid automatic repeat request indicator channel (PHICH), the physical downlink control channel (PDCCH), the physical downlink synchronization signal, the physical broadcast channel (PBCH), the physical downlink shared channel (PDSCH)/the physical multicast channel (PMCH), and the downlink reference signal are disposed in a wireless frame that is used in the downlink.

As depicted in FIG. 4, the physical random access channel (PRACH), the physical uplink control channel (PUCCH), the physical uplink shared channel (PUSCH), an uplink decoding reference signal, and an uplink measurement reference signal are disposed in the wireless frame that is used in the uplink.

One sub-frame (for example, the sub-frame #F0) is divided into two slots #S0 and #S1. When a normal cyclic prefix (normal CP) is used, a slot in the downlink is configured by seven OFDM symbols (see FIG. 3) and a slot in the uplink is configured by seven SC-FDMA (Single Carrier-Frequency Division Multiple Access) symbols (see FIG. 4).

When an expanded CP (also referred to as "long CP" or "extended CP") is used, a slot in the downlink is configured by six OFDM symbols and a slot in the uplink is configured by six SC-FDMA symbols.

One slot is divided into a plurality of blocks in the direction of the frequency. One physical resource block (PRB) is configured using 12 sub-carriers at 15 kHz as the unit in the direction of the frequency. The number of physical resource blocks (PRBs) is supported from six to 110 depending on the system bandwidth. FIGS. 3 and 4 depict the case where the number of physical resource blocks (PRBs) is 25. Different system bandwidths can also be used in the uplink and the downlink. 6 to 110 physical resource blocks (PRBs) can be supported depending on the total system bandwidth. A component carrier is usually configured by 100 physical resource blocks. A guard band is inserted between component carriers and five component carriers can be configured for 500 physical resource blocks as the whole system bandwidth. Representing the above using bandwidths, for example, a component carrier is configured by 20 MHz, a guard band is inserted between component carriers, and five component carriers can be configured for 100 MHz as the whole system bandwidth.

The resource allocation for the downlink and that for the uplink are executed by sub-frame by sub-frame in the direction of time and by physical resource block (PRBs) by physical resource block in the direction of the frequency. Two slots in a sub-frame are allocated using one resource allocation signal.

The unit that is configured by a sub-carrier and an OFDM symbol, or a sub-carrier and an SC-FDMA symbol is referred to as "resource element". A modulation symbol, etc., are mapped onto each resource element in a resource mapping process in the physical layer.

In a process in the physical layer of the downlink transport channel, a 24-bit cyclic redundancy check (CRC) to the physical downlink shared channel (PDSCH), channel coding (transmission path coding), the physical layer HARQ process, channel interleaving, scrambling, modulation (QPSK (Quadrature Phase Shift Keying), 16QAM (Quadrature Amplitude Modulation), and 64QAM), layer mapping, precoding, resource mapping, and antenna mapping are executed.

On the other hand, in a process in the physical layer of the uplink transport channel, a 24-bit cyclic redundancy check (CRC) to the physical uplink shared channel (PDSCH), channel coding (transmission path coding), the physical layer HARQ process, scrambling, modulation (QPSK, 16QAM, and 64QAM), resource mapping, and antenna mapping are executed.

The physical downlink control channel (PDCCH), the physical hybrid automatic repeat request indicator channel (PHICH), and the physical control format indicator channel (PCFICH) are disposed below the first 30 FDM symbols.

In the physical downlink control channel (PDCCH), a transport format (that defines the modulation scheme, the coding scheme, the transport block size, etc.), the resource allocation, and the HARQ information for each of the downlink shared channel (DL-SCH) and the paging channel (PCH) are transmitted.

In the physical downlink control channel (PDCCH), a transport format (that defines the modulation scheme, the coding scheme, the transport block size, etc.), the resource allocation, and the HARQ information for the uplink shared channel (UL-SCH) are transmitted.

A plurality of physical downlink control channels (PDCCHs) are supported and the mobile station apparatus monitors the set of the physical downlink control channels (PDCCHs).

The physical downlink shared channel (PDSCH) allocated by the physical downlink control channel (PDCCH) is mapped onto the same sub-frame as that of the physical downlink control channel (PDCCH).

The physical uplink shared channel (PUSCH) allocated by the physical downlink control channel (PDCCH) is mapped onto a sub-frame at a predetermined position. For example, when the downlink sub-frame number of the physical downlink control channel (PDCCH) is "N", the physical uplink shared channel (PUSCH) is mapped onto an uplink sub-frame whose number is "N+4".

The mobile station apparatus is identified using 16-bit MAC layer identification information (MAC ID) in the resource allocation in the uplink/downlink by the physical downlink control channel (PDCCH). This 16-bit MAC layer identification information (MAC ID) is included in the physical downlink control channel (PDCCH).

The downlink reference signal (downlink pilot channel) that is used for measurement of the state of the downlink and demodulation of the downlink data is disposed in each of the first and the second OFDM symbols from the head and the third OFDM symbol from the last of each slot.

On the other hand, an uplink demodulation reference signal (demodulation pilot (DRS: Demodulation Reference Signal)) that is used for demodulation of the physical uplink shared channel (PUSCH) is transmitted using the fourth SC-FDMA symbol of each slot.

The uplink measurement reference signal (scheduling pilot (SRS: Sounding Reference Signal)) that is used for the measurement of the state of the uplink is transmitted using the last SC-FDMA symbol of a sub-frame.

The demodulation reference signal of the physical uplink control channel (PUCCH) is defined for each format of the physical uplink control channel and is transmitted using the third, the fourth, and the fifth SC-FDMA symbols of each slot or the second and the sixth SC-FDMA symbols of each slot.

The physical broadcast channel (PBCH) and the downlink synchronization signal are disposed in a band that corresponds to six physical resource blocks in the center of the system band. The physical downlink synchronization signal is transmitted using the sixth and the seventh OFDM symbols of each slot of the first (sub-frame #F0) and the fifth (sub-frame #F4) sub-frames.

The physical broadcast channel (PBCH) is transmitted using the fourth and the fifth OFDM symbols of the first slot (slot #S0) and the first and the second OFDM symbols of the second slot (slot #S1) of the first sub-frame (sub-frame #F0).

The physical random access channel (PRACH) is configured by a bandwidth that corresponds to six physical resource blocks in the direction of the frequency, and one sub-frame in the direction of time. The physical random access channel (PRACH) is transmitted from the mobile station apparatus to the base station apparatus to give requests (such as a request for uplink resources, a request for an uplink synchronization, a downlink data transmission restart request, a handing-over request, a connection setting request, a reconnection request, and an MBMS service request) for various reasons.

The physical uplink control channel (PUCCH) is disposed at both ends of the system band and is configured on a physical resource block basis. Frequency hopping is executed such that the ends of the system band are alternately used among slots.

Figure 5:
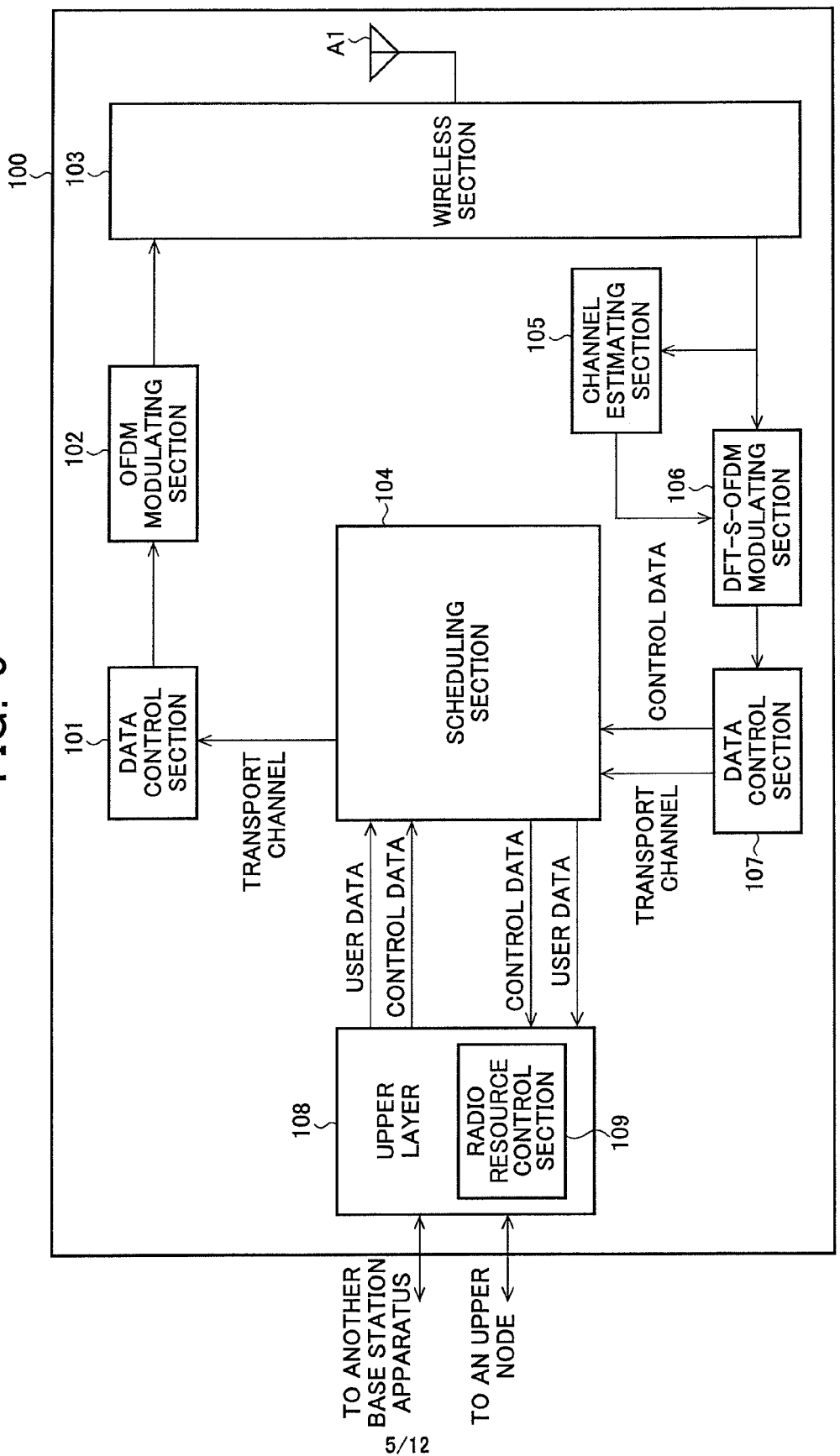
FIG. 5 is a schematic block diagram of the configuration of a base station apparatus according to the first embodiment of the present invention.

FIG. 5 is a schematic block diagram of the configuration of the base station apparatus 100 according to the first embodiment of the present invention. The base station apparatus 100 includes a data control section 101, an OFDM modulating section 102, a wireless section 103, a scheduling section 104, a channel estimating section 105, a DFT-S-OFDM (DFT-Spread-OFDM) demodulating section 106, a data extracting section 107, an upper layer 108, and an antenna section A1.

The wireless section 103, the scheduling section 104, the channel estimating section 105, the DFT-S-OFDM demodulating section 106, the data extracting section 107, the upper layer 108, and the antenna section A1 configure a receiving section. The data control section 101, the OFDM modulating section 102, the wireless section 103, the scheduling section 104, the upper layer 108, and the antenna section A1 configure a transmitting section. A section of each of the transmitting and the receiving sections is configured to separately execute processing for each component carrier, and another section thereof is configured to execute processing that is common to the component carriers.

The antenna section A1, the wireless section 103, the channel estimating section 105, the DFT-S-OFDM demodulating section 106, and the data extracting section 107 execute processing for the physical layer of the uplink. The antenna section A1, the data control section 101, the OFDM modulating section 102, and the wireless section 103 execute processing for the physical layer of the downlink.

The data control section 101 acquires the transport channel from the scheduling section 104. The data control section 101 maps the transport channel and the signals and the channels created in the physical layer based on the scheduling information input from the scheduling section 104, onto the physical channel based on the scheduling information input from the scheduling section 104. Pieces of data mapped as above are output to the OFDM modulating section 102.

The OFDM modulating section 102 executes OFDM signal processing such as coding, data modulation, serial/parallel transformation of an input signal, an IFFT (Inverse Fast Fourier Transformation) process, insertion of a cyclic pre-fix (CP), and filtering, for data that is input from the data control section 101 based on the scheduling information input from the scheduling section 104 (including downlink physical resource block (PRB) allocation information (for example, physical resource block position information such as the frequency and time), and the modulation schemes and the coding schemes that support the downlink physical resource blocks (PRBs) (including such as 16QAM modulation and a 2/3 coding rate), and the OFDM modulating section 102 creates an OFDM signal and outputs the OFDM signal to the wireless section 103.

The wireless section 103 creates a wireless signal by up-converting the modulated data that is input from the OFDM modulating section 102 into that of a wireless frequency, and transmits the up-converted data to the mobile station apparatus 200 through the antenna section A1. The wireless section 103 receives a wireless signal in the uplink from the mobile station apparatus 200 through the antenna section A1, and outputs the received signal to the channel estimating section 105 and the DFT-S-OFDM demodulating section 106 by down-converting the received signal into a baseband signal.

The scheduling section 104 executes processing for a medium access control (MAC) layer. The scheduling section 104 executes mapping of the logical channel and the transport channel, and scheduling for the downlink and the uplink (the HARQ process, selection of a transport format, etc.) and the like. The scheduling section 104 integrates the processing sections of the physical layers to control the sections and, therefore, an interface is present between the scheduling section 104, and the antenna section A1, the wireless section 103, the channel estimating section 105, the DFT-S-OFDM demodulating section 106, the data control section 101, the OFDM modulating section 102, and the data extracting section 107. However, the interface is not depicted.

In the scheduling for the downlink, the scheduling section 104 executes processing for selecting the transport format (transmission form) of the downlink to modulate each piece of data (such as allocation, the modulation scheme, and the coding scheme of the physical resource blocks (PRBs)), retransmission control in HARQ, and generation of the scheduling information to be used in the scheduling for the downlink, based on feedback information received from the mobile station apparatus 200 (including the channel feedback report of the downlink (such as the channel quality (CQI), the number of streams (RI), and pre-coding information (PMI)), information on the downlink physical resource blocks (PRBs) that are available for the mobile station apparatuses such as ACK/NACk feedback information for the downlink data), the state of a buffer, the scheduling information input from the upper layer 108, etc.

The scheduling information used in the scheduling for the downlink is output to the data control section 101 and the data extracting section 107.

In the scheduling for the uplink, the scheduling section 104 executes processing for selecting the transport format (transmission form) of the uplink to modulate each piece of data (such as allocation, the modulation scheme, and the coding scheme of the physical resource blocks (PRBs)) and generation of the scheduling information to be used in the scheduling for the uplink, based on the result of estimation of the channel state (wireless propagation path state) of the uplink that is output from the channel estimating section 105, the resource allocation request from the mobile station apparatus 200, information on downlink physical resource blocks (PRBs) that are available for each mobile station apparatus 200, the scheduling information input from the upper layer 108 and the like.

The scheduling information used in the scheduling for the uplink is output to the data control section 101 and the data extracting section 107.

The scheduling section 104 maps the downlink logical channel that is input from the upper layer 108 onto the transport channel, and outputs the mapping result to the data control section 101. The scheduling section 104 processes the control data acquired in the uplink that is input from the data extracting section 107 and the transport channel as needed, and then, maps the data and the channel that are processed onto the logical channel in the uplink, and outputs the mapping result to the upper layer 108.

To demodulate the uplink data, the channel estimating section 105 estimates the channel state of the uplink from the uplink demodulation reference signal (DRS) and outputs the estimation result to the DFT-S-OFDM demodulating section 106. To execute the scheduling for the uplink, the channel estimating section 105 estimates the channel state of the uplink from the uplink measurement reference signal (SRS: Sounding Reference Signal) and outputs the estimation result to the scheduling section 104.

A single-carrier scheme such as DFT-S-OFDM is assumed as the communication scheme of the uplink. However, a multi-carrier scheme such as an OFDM scheme may be used.

The DFT-S-OFDM demodulating section 106 applies a demodulation processing to the modulated data input from the wireless section 103 by executing DFT-S-OFDM signal processing such as DFT (Discrete Fourier Transformer) transformation, sub-carrier mapping, IFFT transformation, and filtering, based on the estimation result of the uplink channel state that is input from the channel estimating section 105, and outputs the processed data to the data extracting section 107.

The data extracting section 107 checks errors in the data that is input from the DFT-S-OFDM demodulating section 106 based on the scheduling information from the scheduling section 104 and outputs the check result (positive signal ACK/negative signal NACK) to the scheduling section 104.

The data extracting section 107 separates the data input from the DFT-S-OFDM demodulating section 106 into the transport channel and the control data of the physical layer based on the scheduling information from the scheduling section 104, and outputs the channel and the data to the scheduling section 104.

The separated control data includes such as feedback information notified from the mobile station apparatus 200 (a downlink channel feedback report (CQI, PMI, and RI) and ACK/NACK feedback information for data in the downlink).

The upper layer 108 executes processing for a packet data convergence protocol (PDCP) layer, a radio link control (RLC) layer, and a radio resource control (RRC) layer. The upper layer 108 integrates processing sections of a lower layer to control the processing sections and, therefore, an interface is present between the upper layer 108 and the scheduling section 104, the antenna section A1, the wireless section 103, the channel estimating section 105, the DFT-S-OFDM demodulating section 106, the data control section 101, the OFDM modulating section 102, and the data extracting section 107. However, the interface is not depicted.

The upper layer 108 includes a radio resource control section 109. The radio resource control section 109 executes management of various pieces of setting information, management of the system information, paging control, management of the communication state of the mobile station apparatuses, management of moving such as handing over, management of the buffer state of each mobile station apparatus, management of the connection setting of unicast and multicast bearers, management of mobile station identifiers (UEIDs), etc. The upper layer 108 delivers and receives information to another base station apparatus and information to an upper node.

Figure 6:
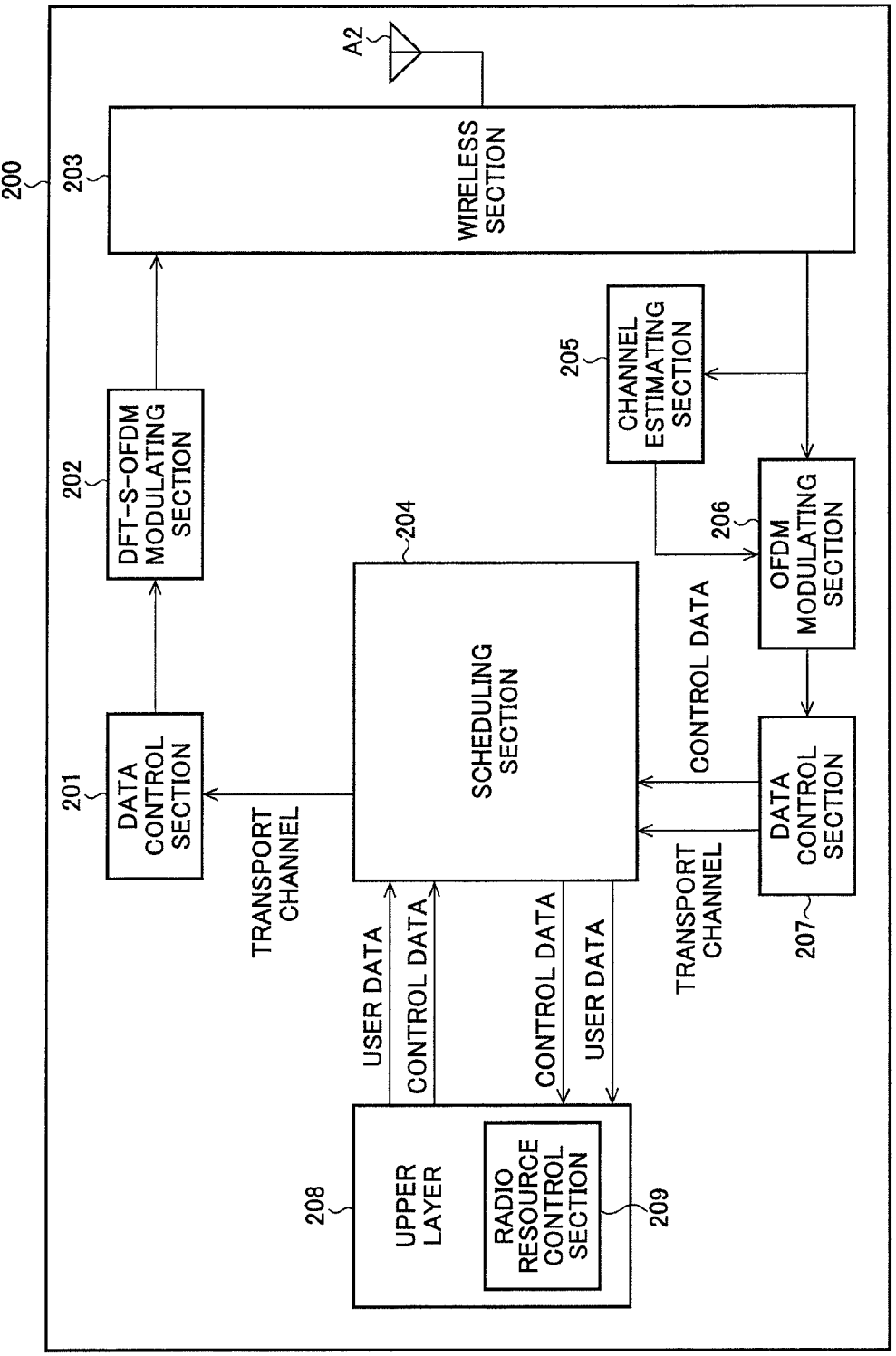
FIG. 6 is a schematic block diagram of the configuration of a mobile station apparatus according to the first embodiment of the present invention.

FIG. 6 is a schematic block diagram of the configuration of the mobile station apparatus 200 according to the first embodiment of the present invention. The mobile station apparatus 200 includes a data control section 201, a DFT-S-OFDM modulating section 202, a wireless section 203, a scheduling section 204, a channel estimating section 205, an OFDM demodulating section 206, a data extracting section 207, an upper layer 208, and an antenna section A2.

The data control section 201, the DFT-S-OFDM modulating section 202, the wireless section 203, the scheduling section 204, the upper layer 208, and the antenna section A2 configure a transmitting section. The wireless section 203, the scheduling section 204, the channel estimating section 205, the OFDM demodulating section 206, the data extracting section 207, the upper layer 208, and the antenna section A2 configure a receiving section. The scheduling section 204 configures a selecting section.

The antenna section A2, the data control section 201, the DFT-S-OFDM modulating section 202, and the wireless section 203 execute processing for the physical layer in the uplink. The antenna section A2, the wireless section 203, the channel estimating section 205, the OFDM demodulating section 206, and the data extracting section 207 execute processing for the physical layer in the downlink. A section of each of the transmitting and the receiving sections is configured to separately execute processing for each component carrier, and another section thereof is configured to execute processing common to the component carriers.

The data control section 201 acquires the transport channel from the scheduling section 204. The data control section 201 maps the signals and the channels that are created in the physical layer based on the transport channel and the scheduling information that is input from the scheduling section 204, onto the physical channel based on the scheduling information input from the scheduling section 204. Pieces of data mapped in this manner are output to the DFT-S-OFDM modulating section 202.

The DFT-S-OFDM modulating section 202 executes DFT-S-OFDM signal processing such as data modulation, a DFT process, sub-carrier mapping, an inverse fast Fourier transformation (IFFT) process, cycling prefix (CP) insertion, and filtering, for the data input from the data control section 201, thereby, generates a DFT-S-OFDM signal, and outputs the signal to the wireless section 203.

A single-carrier scheme such as DFT-S-OFDM is assumed as the communication scheme of the uplink. However, a multi-carrier scheme such as an OFDM scheme may be used instead.

The wireless section 203 generates a wireless signal by up-converting the modulated data that is input from the DFT-S-OFDM modulating section 202 to a wireless frequency, and transmits the wireless signal to the base station apparatus 100 through the antenna section A2.

The wireless section 203 receives a wireless signal that is modulated by the data in the downlink from the base station apparatus 100 through the antenna section A2, and outputs the received data to the channel estimating section 205 and the OFDM demodulating section 206 by down-converting the received wireless signal to a baseband signal.

The scheduling section 204 executes processing for the medium access control layer. The scheduling section 104 executes mapping of the logical channel and the transport channel, scheduling for the downlink and that for the uplink (the HARQ process, selection of the transport format, etc.), etc. The scheduling section 104 integrates the processing sections of the physical layers to control the processing sections and, therefore, an interface is present between the scheduling section 104, and the antenna section A2, the data control section 201, the DFT-S-OFDM modulating section 202, the channel estimating section 205, the OFDM demodulating section 206, the data extracting section 207, and the wireless section 203. However, the interface is not depicted.

In the scheduling for the downlink, the scheduling section 204 executes reception control of the transport channel, physical signals, and the physical channels, the HARQ retransmission control, and generation of the scheduling information to be used in the scheduling for the downlink based on the scheduling information (the transport format and the HARQ retransmission information) from the base station apparatus 100 and the upper layer 208. The scheduling information used in the scheduling for the downlink is output to the data control section 201 and the data extracting section 207.

In the scheduling for the uplink, the scheduling section 204 executes a scheduling processing for mapping the logical channel of the uplink that is input from the upper layer 208 onto the transport channel, and generation of the scheduling information to be used in the scheduling of the uplink, based on the state of the buffer, the scheduling information (the transport format, the HARQ retransmission information, etc.) of the uplink from the base station apparatus 100 that is input from the data extracting section 207, the scheduling information that is input from the upper layer 208, and the like.

The information reported from the base station apparatus 100 is used for the transport format of the uplink. The scheduling information is output to the data control section 201 and the data extracting section 207.

The scheduling section 204 maps the uplink logical channel that is input from the upper layer 208 onto the transport channel, and outputs the mapping result to the data control section 201. The scheduling section 204 also outputs to the data control section 201 the downlink channel feedback report (CQI, PMI, and RI) input from the channel estimating section 205 and the result of the CRC check input from the data extracting section 207.

The scheduling section 204 executes processing for the control data acquired in the downlink that is input from the data extracting section 207 and the transport channel as needed, thereafter, maps the data and the channel that are processed onto the logical channel in the downlink, and outputs the mapping result to the upper layer 208.

To demodulate the downlink data, the channel estimating section 205 estimates the channel state of the downlink from the downlink reference signal (RS) and outputs the estimation result to the OFDM demodulating section 206.

The channel estimating section 205 estimates the channel state of the downlink from the downlink reference signal (RS), converts the estimation result into a downlink channel feedback report (including channel quality information), and outputs the report to the scheduling section 204 in order to notify the base station apparatus 100 of the estimation result of the downlink channel state (wireless propagation path state).

The OFDM demodulating section 206 applies an OFDM demodulation processing to the modulated data input from the wireless section 203 based on the downlink channel state estimation result that is input from the channel estimating section 205, and outputs the resultant data to the data extracting section 207.

The data extracting section 207 executes the cyclic redundancy check (CRC) for the data input from the OFDM demodulating section 206, thereby, checks for errors in the data, and outputs the check result (ACK/NACK feedback information) to the scheduling section 204.

The data extracting section 207 separates the data input from the OFDM demodulating section 206 into the transport channel and the control data of the physical layer based on the scheduling information from the scheduling section 204, and outputs the channel and the data to the scheduling section 204. The separated control data includes the scheduling information such as the resource allocation for the downlink or the uplink and the HARQ control information of the uplink. At this time, the resource allocation for the downlink or the uplink addressed to its own station and the like are extracted by executing decode processing to a search space (also referred to as "search region") of the physical downlink control signal (PDCCH).

The upper layer 208 executes processing for the packet data convergence protocol (PDCP) layer, the radio link control (RLC) layer, and the radio resource control (RRC) layer. The upper layer 208 includes a radio resource control section 209. The upper layer 208 integrates the processing sections of the lower layer to control the processing sections and, therefore, an interface is present between the upper layer 208 and the scheduling section 204, the antenna section A2, the data control section 201, the DFT-S-OFDM modulating section 202, the channel estimating section 205, the OFDM demodulating section 206, the data extracting section 207, and the wireless section 203. However, the interface is not depicted.

The radio resource control section 209 executes management of various kinds of setting information, management of the system information, the paging control, management of the communication state of the mobile station itself, management of moving such as handing over, management of the buffer state, management of the connection settings of unicast and multicast bearers, and management of a mobile station identifier (UEID).

Returning to the description of the first embodiment, processing of the base station apparatus 100 and that of the mobile station apparatus 200 will be described.

A "DL master region" is a downlink frequency layer (a component carrier or a component carrier group) that the mobile station apparatus first accesses. The mobile station apparatus acquires a signal in this region and, thereafter, can access another region (slave region). A downlink synchronization signal (SCH) is disposed in the region, from which at least downlink synchronization can be acquired.

A "DL slave region" is a downlink frequency layer (a component carrier or a component carrier group) that the mobile station apparatus accesses after acquiring the information in the master region or that the mobile station apparatus accesses after an additional instruction by the base station apparatus.

A "UL master region" is an uplink frequency layer (a component carrier or a component carrier group) that the mobile station apparatus first accesses, and is a component carrier or a component carrier group that is designated by the DL master region or that is correlated with the DL master region.

A "UL slave region" is an uplink frequency layer (a component carrier or a component carrier group) that the mobile station apparatus accesses after communication using the UL master region or that the mobile station apparatus accesses after an additional instruction by the base station apparatus.

Hereinafter, a master region or a slave region simply refers to a DL master region and/or a UL master region, or a DL slave region and/or a UL slave region.

Specific channels (such as the downlink synchronization signal (SCH), the physical downlink broadcast channel (PBCH), the broadcast control channel (BCCH), the paging control channel (PCCH), the common control channel (CCCH), and/or the physical uplink control channel (PUCCH)) may not sometimes present in the slave region.

Master regions and slave regions for the mobile station apparatuses may differ from each other. A master region for a mobile station apparatus may be adapted to be a slave region for another mobile station apparatus. In this case, the downlink synchronization signal (SCH) may also be disposed in a slave region for the mobile station apparatus.

A master region and a slave region may be disposed at carrier frequencies that are next to each other or may be disposed at carrier frequencies that are away from each other.

System information elements (parameters) managed in RRC are broadcast in the broadcast control channel (BCCH), or reported from the base station apparatus to the mobile station apparatus using RRC signaling of the common control channel (CCCH) and/or the dedicated control channel (DCCH).

The system information elements (IE) managed in this RRC are managed by classifying them into the parameters that are commonly used among all the component carriers (CCC: Component Carrier Common) and the parameters that are different for each component carrier (that each are specific to each component carrier) (CCD: Component Carrier Dedicated). A system information element that is commonly used among all the component carriers is referred to as "CCC system information element (CCCIE)". A system information element that is different for each component carrier is referred to as "CCD system information element (CCDIE)".

For example, examples of CCCIEs can be IEs such as plmn-Identity, s-Periodicity, and cell Identity. Examples of CCDIDs can be IEs that are used in "Idle" state such as trackingAreaCode, cellBarred, q-Hyst, and t-Reselection-EUTRAN, and IEs that are used in "Connected" state such as systeminformationValueTag, and radioResourceConfig-Common. When only one component carrier is adapted to be camped in the Idle state, one component carrier only need to be managed even for CCCIE or CCDIE.

The scheduling and the IE management of the mobile station apparatus may also be simplified by preparing not only a system information block SIB that has CCCIEs and CCDIEs mixed therein (an aggregation of a plurality of IEs transmitted at the same transmission cycle) but also newly preparing SIB including only CCDIEs.

When giving notice of CCDIE using the RRC signaling, a new type of RRC message that gives notice of IE by designating the component carrier number may be prepared or the notice of IE may be given by expanding an RRC connection reconfiguration message (RRCConnectionReconfiguration Message) and designating the component carrier number.

When giving notice of CCDIE using SIB, the notice of IE is given by designating the number of the component carrier to which the CCDIE is applied.

FIG. 7 is a sequence chart of processes of the wireless communication system according to the first embodiment of the present invention.

First, the mobile station apparatus 200 acquires the downlink synchronization signal (SCH) of the base station apparatus 100 by a cell selection processing or a cell reselection processing, and executes a downlink synchronization processing (step S101). At this step, the downlink synchronization signal (SCH) is disposed in a master region Z01.

The mobile station apparatus 200 acquires the broadcast control channel (BCCH) that is transmitted on the physical broadcast channel (PBCH) or the physical downlink shared channel (PDSCH) as operated in the master region Z01 (step S102). At this step, the mobile station apparatus 200 acquires information on the master region Z01 (such as the system bandwidth (the number of resource blocks) of the master region Z01) from the broadcast control channel (BCCH) (step S103), and executes a continued processing as operated in the master region Z01.

The mobile station apparatus 200 executes an RRC connection establishing processing in the master region Z01 and, thereby, establishes the communication state (RRC connection state). The information regarding addition of a component carrier (such as information indicating items such as the system bandwidth of the master region (the number of resource blocks) and/or the carrier frequency and the system bandwidth (the number of resource blocks) of a slave region Z02, and/or version information of the mobile station apparatus 200) are reported from the base station apparatus 100 to the mobile station apparatus 200 using an RRC connection setup (the common control channel (CCCH) (RRC signaling)) during the RRC connection establishing process and the dedicated control channel (DCCH) (RRC signaling) to the mobile station apparatus 200 that is in communication with (step S104).

The common control channel (CCCH) and the dedicated control channel (DCCH) are mapped onto the downlink shared channel (DL-SCH) in the master region Z01. This downlink shared channel (DL-SCH) is transmitted using dynamic resources of the physical downlink shared channel that is designated by the physical downlink control channel (PDCCH).

The mobile station apparatus 200 that has acquired the information on the addition of the component carrier adjusts the wireless section 203 such that the wireless section 203 can receive up to the slave section Z02.

After acquiring the information on the addition of the component carrier, the mobile station apparatus 200 acquires the system information elements that are defined in CCD from the broadcast control channel (BCCH) that is broadcast in the slave region. Alternatively, the base station apparatus 100 notifies the mobile station apparatus 200 of the information on the addition of the component carrier and the CCD system information elements defined in CCD using RRC signaling transmitted by the common control channel (CCCH) and the dedicated control channel (DCCH).

When the mobile station apparatus 200 get informed the CCD system information elements from the base station apparatus 100 using the RRC signaling, the mobile station apparatus 200 manages the CCD system information elements for each component carrier (step S105). The mobile station apparatus 200 manages the CCD system information elements, CCDIE1, CCDIE2, . . . , CCDIEn, respectively for component carriers 1, 2, . . . , n and manages the CCC system information element, CCCIE, that is common to the component carriers.

The mobile station apparatus 200 may start communication using each component carrier in the order of acquiring CCDIE, or may start communication using the added component carriers after acquiring all the CCDIEs for the added component carriers.

When the base station apparatus 100 has a plurality of master regions Z01 in a band to accommodate them, the base station apparatus 100 needs to detect the master region Z01 of the mobile station apparatus 200. The master region Z01 of the mobile station apparatus 200 is detected using the physical random access channel (PRAXH) or the random access channel (RACH), or the master region Z01 of the mobile station apparatus 200 is reported from the mobile station apparatus 200 to the base station apparatus 100 using the common control channel (CCCH) during a procedure for random accessing.

The master region Z01 of the mobile station apparatus 200 is designated from the base station apparatus 100 using the dedicated control channel (DCCH) and is changeable.

The left side of the sequence chart of FIG. 7 depicts frequency regions receivable at steps for the mobile station apparatus 200 and the system information elements used by the mobile station apparatus 200. The mobile station apparatus 200 can receive resources in a region necessary for acquiring the physical broadcast channel disposed in a part of the master region Z01 at steps S101 to S103, resources in a region of the master region Z01 at steps S103 to S105, and resources in the master region Z01 and the slave region Z02 at and after step S105.

A method for separately managing CCD and CCC from each other in each of the uplink and the downlink will be described. The system information elements (IE) that are managed by RRC are managed by classifying them into parameters that are commonly used among all the component carriers in the downlink (CCCDL: Component Carrier Common Downlink) and parameters that each are different for a component carrier in the downlink (CCDDL: Component Carrier dedicated Downlink), parameters that are commonly used among all the component carriers in the uplink (CCCUL: Component Carrier Common Uplink) and parameters that each are different for a component carrier in the uplink (CCDUL: Component Carrier dedicated Uplink).

At step 104, after acquiring the information on the addition of the component carrier, the mobile station apparatus 200 determines whether the information on the component carrier addition indicates uplink component carrier addition, downlink component carrier addition, or downlink and uplink component carrier addition. Designation as to whether the component carrier to be added is that of the uplink or the downlink is issued for the RRC signaling for component addition.

The mobile station apparatus 200 acquires system information elements defined in CCDUL when the component carrier addition is for the uplink, system information elements defined in CCDDL when the component carrier addition is for the downlink, and system information elements defined in CCDDL and CCDUL when the component carrier addition is for the downlink and the uplink, from the broadcast control channel (BCCH) that is broadcast in the slave region. Alternatively, the base station apparatus 100 notifies the mobile station apparatus 200 of information on the component carrier addition and CCD system information elements defined in CCDDL and/or CCDLL, using the RRC signaling transmitted in the common control channel (CCCH) and the dedicated control channel (DCCH).

When the mobile station apparatus 200 get informed the CCD system information elements from the base station apparatus 100 using the RRC signaling, the mobile station apparatus 200 manages the CCD system information elements for each uplink component carrier and each downlink component carrier. The mobile station apparatus 200 manages: CCDUL system information elements (CCDULIE 1, CCDULIE 2, . . . , CCDULIE n) respectively for UL component carrier 1, UL component carrier 2, . . . , UL component carrier n; CCDDL system information elements (CCDDLIE 1, CCDDLIE 2, . . . , CCDDLIE m) respectively for DL component carrier 1, DL component carrier 2, . . . , DL component carrier m; and a CCC system information element CCCIE that is common to the component carriers.

The mobile station apparatus 200 may start communication using the uplink component carriers starting from the uplink component carrier whose CCDULIE has been acquired and may start communication using the downlink component carriers starting from the downlink component carrier whose CCDULIE has been acquired. Alternatively, the mobile station apparatus 200 may start communication using these added uplink and/or downlink component carriers after acquiring all the CCDDLIE and/or CCDULIE of the added uplink and/or downlink component carriers that are designated by the base station apparatus 100.

Figure 8:
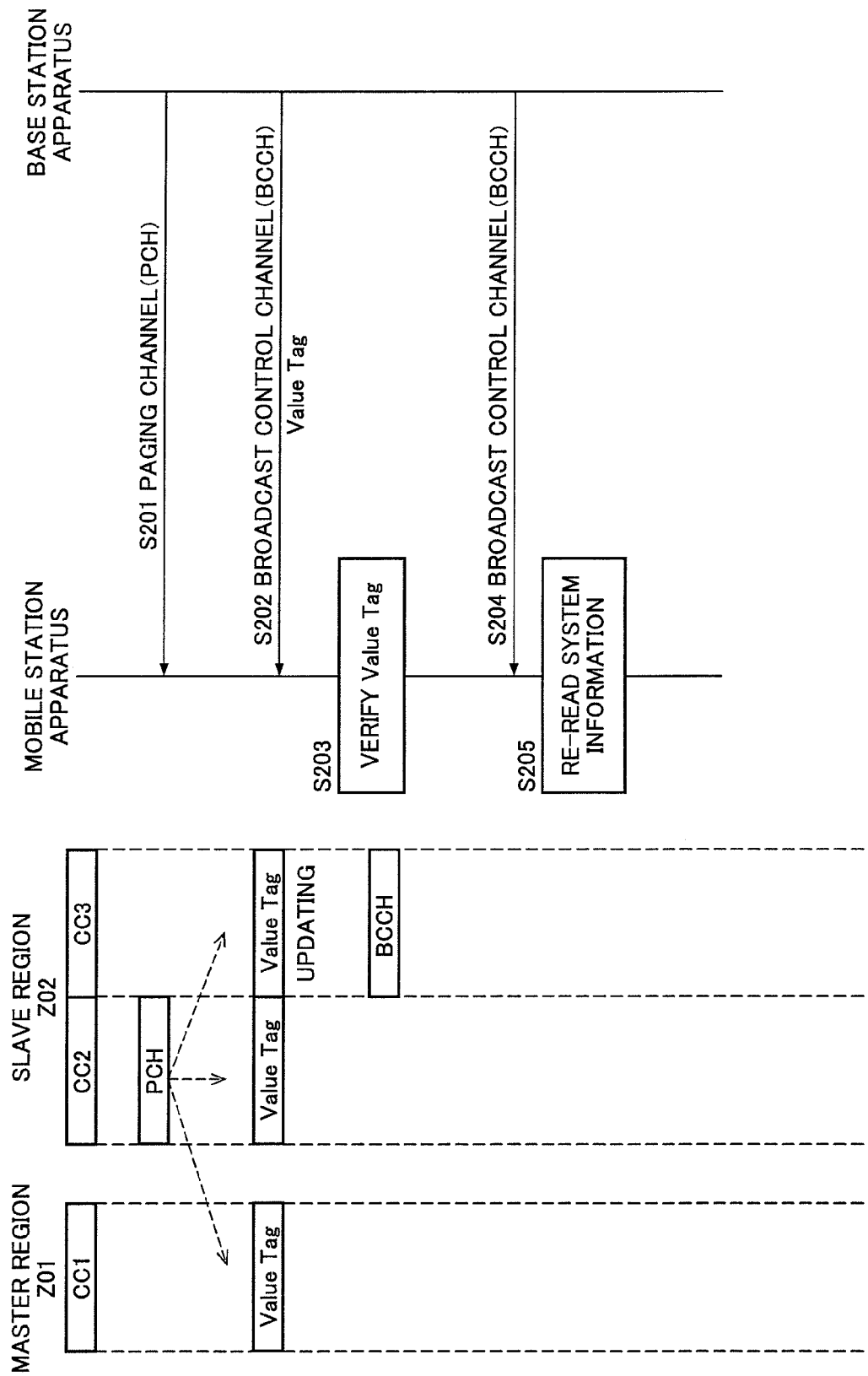
FIG. 8 is a sequence chart for explaining a first method of the procedure of handling the system information change notice according to the present invention.

A first method of the procedure for handling a change notice of the system information will be described with reference to FIG. 8. The change of the system information is reported using the paging channel (PCH). When CCDIE and/or CCCIE is(are) changed, the base station apparatus 100 notifies the mobile station apparatuses in the system of the change by including the change notice in a paging channel (PCH) (step S201).

When the change notice of the system information is included in the paging channel (PCH), the mobile station apparatus 200 verifies a value tag (Value Tag) that is broadcast by each downlink component carrier or each downlink component carrier group in the component carrier group that is accessed by the mobile station (steps S202 and S203). The "value tag (Value Tag)" represents a value that is incremented every time the system information is updated, is the broadcast information to be used to check whether the system information is updated, and is transmitted using the broadcast control channel (BCCH) (step S204). For a system that is configured by a plurality of component carriers, the value tag (Value Tag) indicates whether the system information has been updated for a component carrier on which the value tag (Value Tag) is disposed.

The mobile station apparatus 200 re-reads the system information (broadcast control channel (BCCH)) of the downlink component carrier whose Value Tag indicates a value that is different from that of the Value Tag retained by the mobile station apparatus 200, and updates the system information. The mobile station apparatus 200 re-reads and updates only the system information of the component carrier that is updated (step S205).

In this case, the mobile station apparatus 200 that communicates using the plurality of component carriers monitors the paging channel (PCH) of each of the component carriers.

Figure 9:
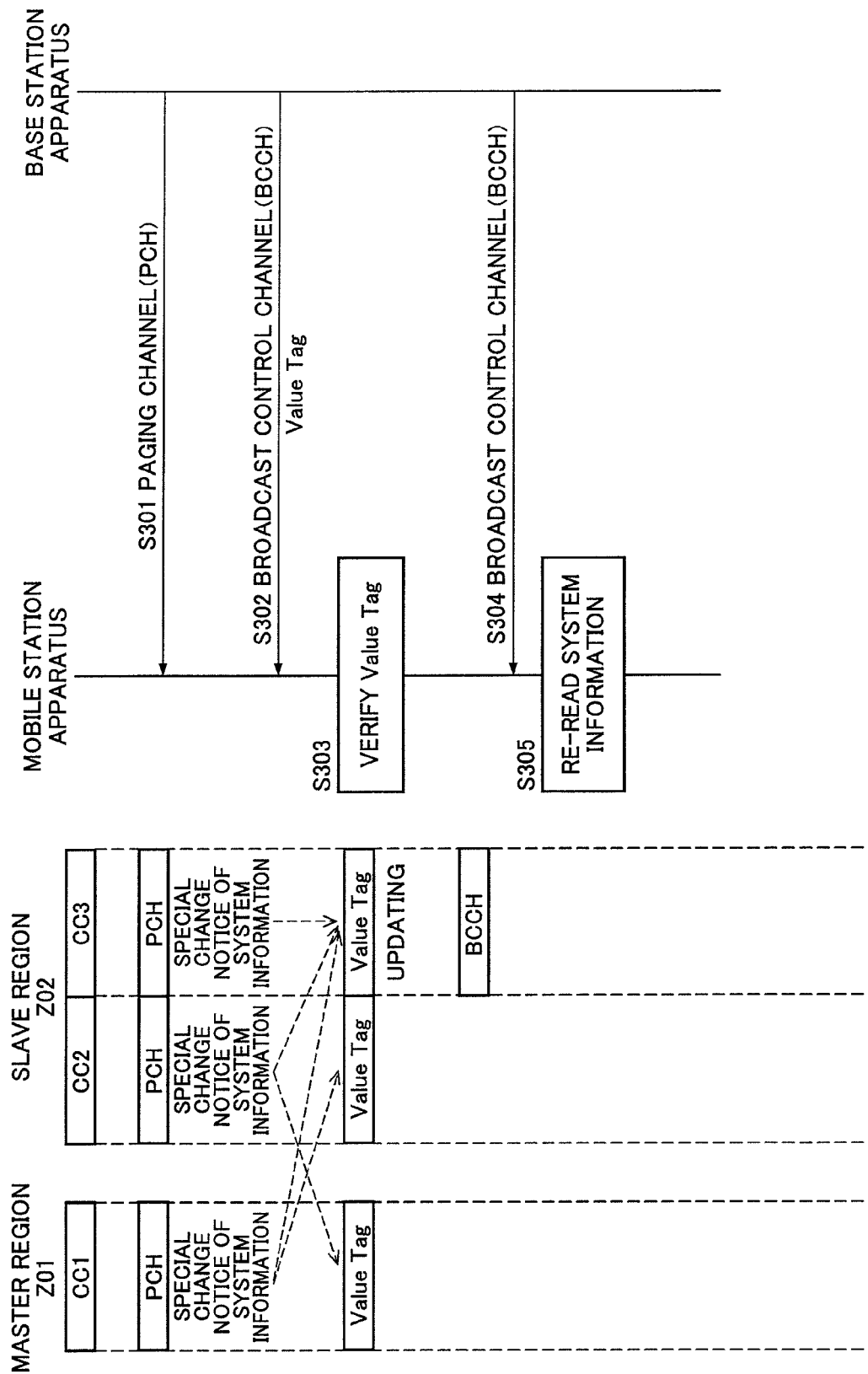
FIG. 9 is a sequence chart for explaining a second method of the procedure of handling the system information change notice according to the present invention.

A second method of the procedure for handling a change notice of the system information will be described with reference to FIG. 9. The change of the system information is reported using the paging channel (PCH). When CCDIE and/or CCCIE is(are) changed, the base station apparatus 100 notifies the mobile station apparatuses in the system of the change by including the change notice in a paging channel (PCH) (step S301).

When CCCIE is changed, the base station apparatus 100 disposes an ordinary change notice on the paging channel (PCH) and notifies the mobile station apparatus 200 that the system information is changed. When CCDIE is changed, an ordinary change notice of the system information is transmitted on the paging channel (PCH) of the component carrier that has actually been changed. When CCDIE is changed, a special change notice of the system information (change notice indicating that the system information is changed for a component carrier other than this component carrier) is transmitted on the paging channel (PCH) of the component carrier other than the component carrier that has actually been changed.

In this case, a mobile station apparatus that communicates using one component carrier does not read any special change of the system information. The special change of the system information is coded to be unreadable for a mobile station apparatus whose release version is old and that can communicate using only one component carrier. The mobile station apparatus whose release version is old and that can communicate using only one component carrier does not notice the special change notice of the system information. As to this, for example, only mobile station apparatuses that communicate using a plurality of component carriers are enabled to receive the special change notice of the system information by coding the special change notice of the system information as option information in the paging channel (PCH), or by transmitting special information attached on the physical downlink control channel (PDCCH) that is used when scheduling is executed for the paging channel (PCH).

For example, a method that the mobile station apparatus 200 determines the kind of paging channel (PCH) from the value of the flag, that is simply disposed to indicate a special change notice of the system information or a method that the mobile station apparatus 200 determines the kind of paging channel (PCH) from a value of MAC ID by setting the value of MAC ID disposed on the physical downlink by control channel (PDCCH) to SPI-RNTI that is different from PI-RNTI that is used in an ordinary paging channel (PCH) and that is different for each component carrier that corresponds to the system information that needs to be updated is used as a method of attaching the special information to the physical downlink control channel (PDCCH) that is used when scheduling is executed for the paging channel (PCH).

When the ordinary change notice of the system information is included in the paging channel (PCH), the mobile station apparatus 200 verifies a value tag (Value Tag) that is broadcast by the component carrier on which the paging channel (PCH) is placed (steps S302 and S303). When the value of Value Tag is different from that of Value Tag retained by the mobile station apparatus 200, the mobile station apparatus 200 re-reads the system information and updates the system information (steps S304 and S305).

When the special change notice of the system information is included in the paging channel (PCH), the mobile station apparatus 200 verifies the value tag (Value Tag) that is broadcast by each of the downlink component carrier or the downlink component carrier group in the component carrier group that is accessed by the mobile station (steps S302 and S303). The mobile station apparatus 200 re-reads the system information of the downlink component carrier whose Value Tag indicates a value that is different from that of Value Tag retained by the mobile station apparatus 200 and, thereby, updates the system information (steps S304 and S305). When the special change notice of the system information is included in the paging channel (PCH), the mobile station apparatus 200 may exclude the component carrier having disposed on the paging channel (PCH) that includes the special change notice of the system information from the component carriers of Value Tag to be verified.

The mobile station apparatus 200 re-reads and updates only the system information of the updated component carrier.

In this case, the mobile station apparatus 200 that communicates using a plurality of component carriers only needs to receive one paging channel (PCH) in the plurality of component carriers.

Figure 10:
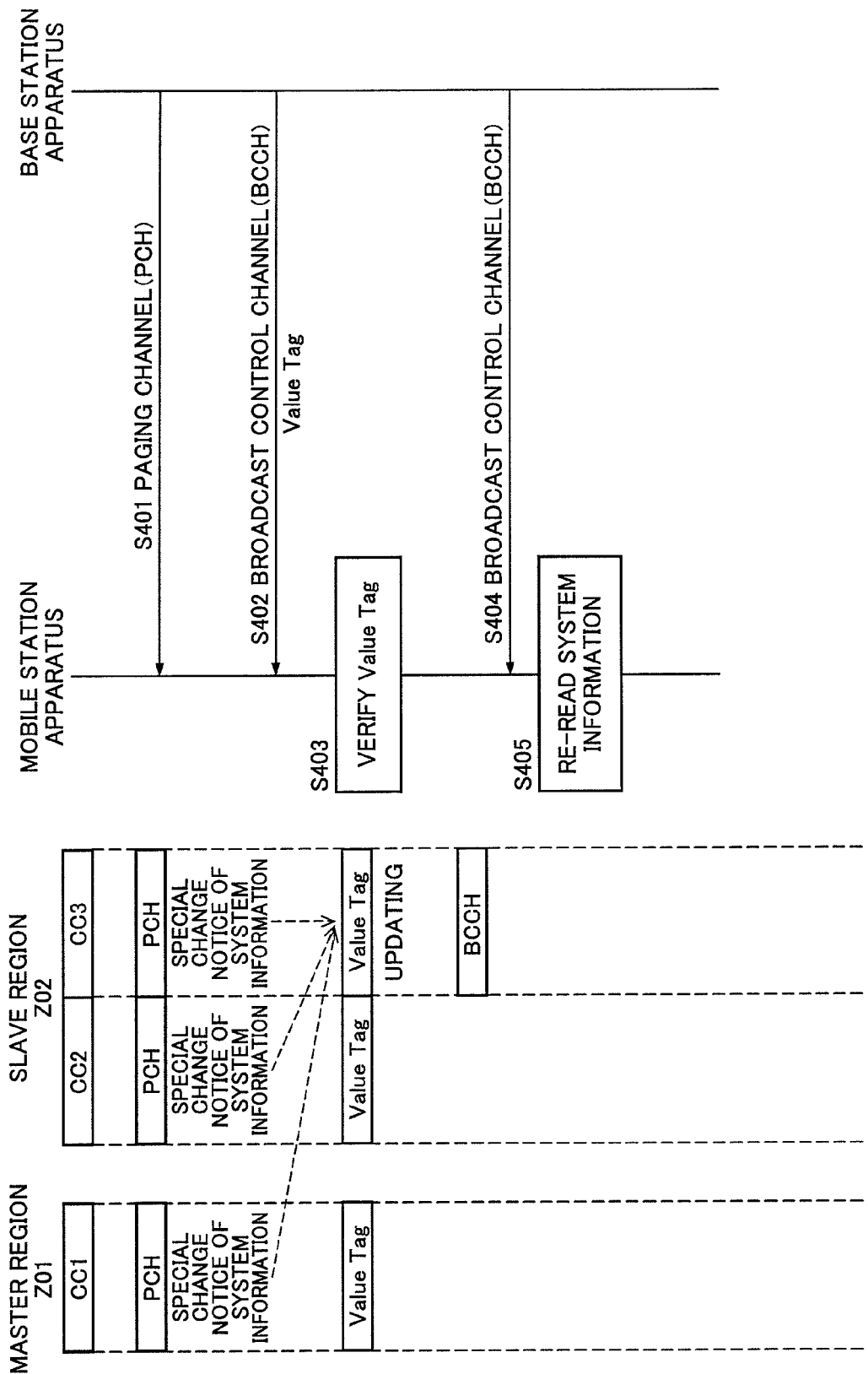
FIG. 10 is a sequence chart for explaining a third method of the procedure of handling the system information change notice according to the present invention.

A third method of the procedure for handling a change notice of the system information will be described with reference to FIG. 10. The change of the system information is reported using the paging channel (PCH). When CCDIE and/or CCCIE is(are) changed, the base station apparatus 100 notifies the mobile station apparatuses in the system of the change by including the change notice in a paging channel (PCH) (step S401).

When CCCIE is changed, the base station apparatus 100 disposes an ordinary change notice on the paging channel (PCH) and notifies the mobile station apparatus 200 that the system information is changed. When CCDIE is changed, an ordinary change notice of the system information is transmitted on the paging channel (PCH) of the component carrier that has actually been changed. When CCDIE is changed, a special change notice of the system information (change notice indicating that the system information is changed for a component carrier other than this component carrier) is transmitted on the paging channel (PCH) of the component carrier other than the component carrier that has actually been changed.

In this case, a mobile station apparatus that communicates using one component carrier does not read any special change of the system information. The special change of the system information is coded to be unreadable for a mobile station apparatus whose release version is old and that can communicate using only one component carrier. The mobile station apparatus whose release version is old and that can communicate using only one component carrier does not notice the special change notice of the system information. The method for giving the special change notice of the system information is the same as the above second method.

In the third method, however, the special change notice of the system information includes information that indicates the component carrier having the changed system information. Based on the information that indicates the component carrier having the changed system information, the mobile station apparatus 200 can specify the component carrier that corresponds to the system information that needs to be updated. Only mobile station apparatuses that communicate using a plurality of component carriers are enabled to receive the special change notice of the system information by coding the special change notice of the system information and information to identify the component carrier that corresponds to the system information that needs to be updated as option information in the paging channel (PCH), or by transmitting the special information attached on the physical downlink control channel (PDCCH) that is used when scheduling is executed for the paging channel (PCH).

For example, a method of disposing a flag simply indicating that the notification is a special notification of the change to the system information and information to identify the component carrier corresponding to the system information that needs to be updated and determining by the mobile station apparatus 200 the component carrier corresponding to the system information that needs to be updated using the value of the flag, and a method of setting the value of MAC ID disposed on the physical downlink control channel (PDCCH) to be SPI-RNTI that is different from PI-RNTI that is used in an ordinary paging channel (PCH) and that is different for each component carrier that corresponds to the system information that needs to be updated and determining by the mobile station apparatus 200 the component carrier that corresponds to the system information that needs to be updated using the value of MAC ID, are used as a method of supplying special information to the physical downlink control channel (PDCCH) that is used when scheduling is executed for the paging channel (PCH).

When the ordinary change notice of the system information is included in the paging channel (PCH), the mobile station apparatus 200 verifies the value tag (Value Tag) that is broadcast by the component carrier on which the paging channel (PCH) is placed (steps S402 and S403). When the value of Value Tag is different from that of Value Tag retained by the mobile station apparatus 200, the mobile station apparatus 200 re-reads the system information and updates the system information (steps S404 and S405).

When the special change notice of the system information is included in the paging channel (PCH), the mobile station apparatus 200 verifies the value tag (Value Tag) that is broadcast by each downlink component carrier that corresponds to information indicating the component carrier having the changed system information in the component carrier group that the mobile station accesses based on the information indicating the component carrier that has the changed system information (steps S402 and S403). When the mobile station apparatus 200 detects the value of Value Tag that is different from that of Value Tag retained by the mobile station apparatus 200, the mobile station apparatus 200 re-reads the system information of the downlink component carrier and updates the system information (steps S404 and S405).

The mobile station apparatus 200 re-reads and updates only the system information of the updated component carrier.

In this case, the mobile station apparatus 200 that communicates using a plurality of component carriers only needs to receive one paging channel (PCH) in the plurality of component carriers.

Figure 11:
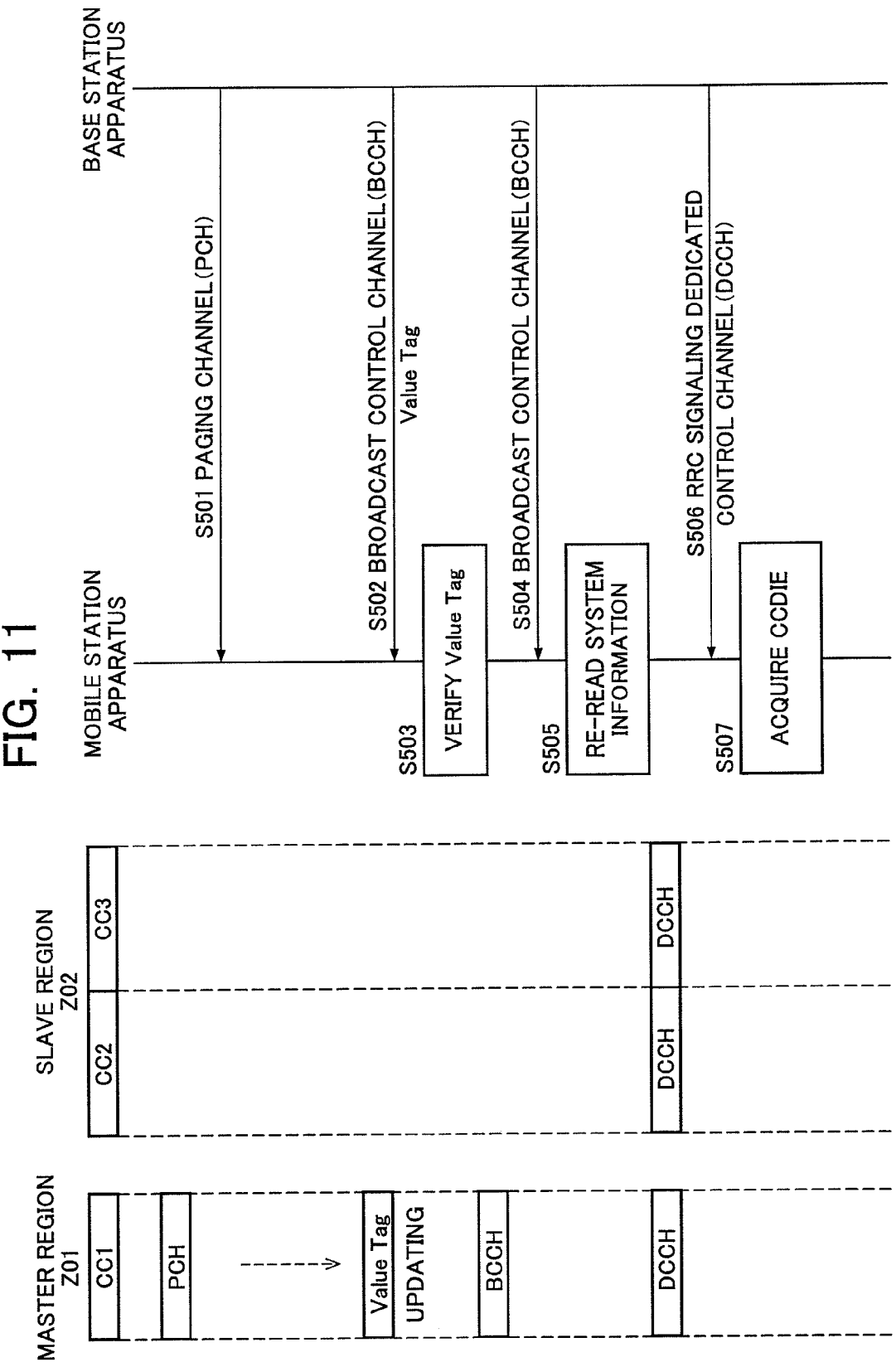
FIG. 11 is a sequence chart for explaining a fourth method of the procedure of handling the system information change notice according to the present invention.
Figure 12:
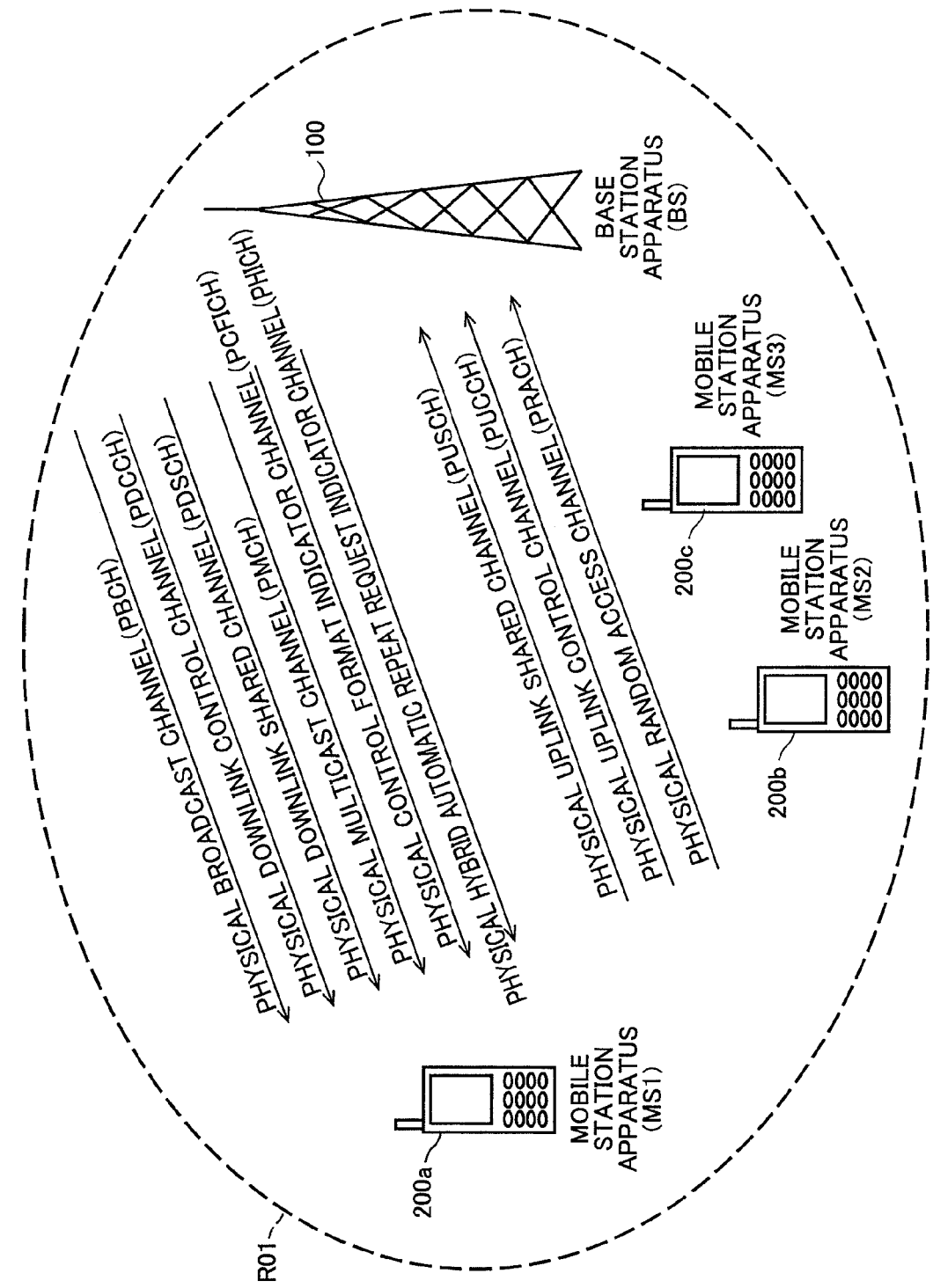
FIG. 12 is a diagram of the channel configuration that is used in a conventional communication system.

A fourth method of the procedure for handling a change notice of the system information will be described with reference to FIG. 11. The change of the system information is reported using the paging channel (PCH). When CCDIE and/or CCCIE is(are) changed, the base station apparatus 100 notifies the mobile station apparatuses in the system of the change by including the change notice in a paging channel (PCH) (step S501).

When CCCIE is changed, the base station apparatus 100 disposes the change notice of the system information on the paging channel (PCH) and notifies the mobile station apparatus 200 that the system information has been changed. When CCDIE is changed, the change notice of the system information is transmitted on the paging channel (PCH) of the component carrier that has actually been changed.

The mobile station apparatus 200 monitors the paging channel (PCH) of the component carrier that is set in the master. When the change notice of the system information is included in the paging channel (PCH), the mobile station apparatus 200 verifies the value tag (Value Tag) that is broadcast by the component carrier on which the paging channel (PCH) is placed (steps S502 and S503). When the value of Value Tag is different from that of Value Tag retained by the mobile station apparatus 200, the mobile station apparatus 200 re-reads the system information and updates the system information (step S504 and S505).

In the case where the mobile station apparatus 200 communicates using a plurality of component carriers, when the system information has been updated on a component carrier that is not in the master region for the mobile station apparatus 200, the base station apparatus 100 notifies the mobile station apparatus 200 of CCDIE using the RRC signaling that is transmitted on the common control channel (CCCH) or the dedicated control channel (DCCH) (step S506). When the mobile station apparatus 200 acquires CCDIE that is given using the RRC signaling from the base station apparatus 100, the mobile station apparatus 200 manages this CCDIE for each component carrier (step S507).

Thereby, the mobile station apparatus 200 only needs to monitor the paging channel (PCH) only in the master region. The base station apparatus 100 only needs to transmit the paging channel (PCH) using only the component carrier that has been changed.

Though the above embodiments have been described assuming that the plurality of component carriers configure one system, it can also be interpreted that a plurality of systems are aggregated to configure one system. It can also be interpreted that the component carrier represents a region for the system to operate therein by setting the carrier frequency to be equal to the center of each component carrier by a specific receiving-side apparatus or a specific transmitting-side apparatus.

For the convenience of description, each of the embodiments has been described taking the example of the case where the base station apparatus and the mobile station apparatus are in a one-to-one relation. However, a plurality of base station apparatuses and a plurality of mobile station apparatuses may be employed. The mobile station apparatus is not limited to a terminal that moves around and may be realized by implementing the functions of the mobile station apparatus on the base station apparatus or a fixed terminal.

In each of the above embodiments, the base station apparatus and the mobile station apparatus may be controlled by recording a program to realize the functions of the base station apparatus and the functions of the mobile station apparatus on a computer-readable recording medium, and causing a computer system to read and execute the program recorded on the recording medium. The "computer system" used herein includes an OS and hardware such as peripherals.

The "computer-readable recording medium" refers to a portable medium such as a flexible disc, a magneto-optical disc, a ROM, or a CD-ROM; or a recording apparatus such as a hard disc incorporated in a computer system. The "computer-readable recording medium" includes a medium that dynamically retains a program for a short time such as a communication cable used when a program is transmitted through a network such as the Internet or a communication line such as a telephone line and a medium that retains a program for a specific length of time such as a volatile memory in a computer system that acts as a server or a client in the above case. The program may be a program to realize some of the above functions or may also be a program that can realize the above functions by being combined with programs that are already recorded on the computer system.

The embodiments of the present invention have been described with reference to the accompanying drawings. However, the specific configurations are not limited to those in the embodiments and designs, etc., within the scope not departing from the purview of the present invention are included in the claims.

EXPLANATIONS OF REFERENCE NUMERALS

100 . . . base station apparatus,
101 . . . data control section,
102 . . . OFDM modulating section,
103 . . . wireless section,
104 . . . scheduling section,
105 . . . channel estimating section,
106 . . . DFT-S-OFDM demodulating section,
107 . . . data extracting section,
108 . . . upper layer,
200 . . . mobile station apparatus,
201 . . . data control section,
202 . . . DFT-S-OFDM modulating section,
203 . . . wireless section,
204 . . . scheduling section,
205 . . . channel estimating section,
206 . . . OFDM demodulating section,
207 . . . data extracting section,
208 . . . upper layer,
A1, A2 . . . antenna section

The invention claimed is:

1. A terminal apparatus comprising:
a wireless circuit configured to and/or programmed to:
communicate with a base station apparatus by carrier aggregation using a plurality of component carriers including a first component carrier and one or more second component carriers;
obtain, from the base station apparatus, first system information broadcasted on the first component carrier;
obtain, from the base station apparatus, second system information corresponding to a component carrier of the one or more second component carriers; and
monitor a system information update notification only in the first component carrier among the plurality of component carriers in order to determine whether the first system information is updated, wherein
the second system information corresponding to the component carrier of the one or more second component carriers is used in a connected state and is updated using dedicated radio resource control signaling.

2. A base station apparatus comprising:
a wireless circuit configured to and/or programmed to:
communicate with a terminal apparatus by carrier aggregation using a plurality of component carriers including a first component carrier and one or more second component carriers for the terminal apparatus;
broadcast first system information on the first component carrier;
provide, to the terminal apparatus, second system information corresponding to a component carrier of the one or more second component carriers; and
transmit a system information update notification in order for the terminal apparatus to determine, by monitoring the system information update notification only in the first component carrier among the plurality of component carriers, whether the first system information is updated, wherein
the second system information corresponding to the component carrier of the one or more second component carriers is used in a connected state and is updated using dedicated radio resource control signaling.

3. A method performed by a terminal apparatus, the method comprising:
communicating with a base station apparatus by carrier aggregation using a plurality of component carriers including a first component carrier and one or more second component carriers;
obtaining, from the base station apparatus, first system information broadcasted on the first component carrier;
obtaining, from the base station apparatus, second system information corresponding to a component carrier of the one or more second component carriers; and
monitoring a system information update notification only in the first component carrier among the plurality of component carriers in order to determine whether the first system information is updated, wherein
the second system information corresponding to the component carrier of the one or more second component carriers is used in a connected state and is updated using dedicated radio resource control signaling.

4. A method performed by a base station apparatus, the method comprising:
communicating with a terminal apparatus by carrier aggregation using a plurality of component carriers including a first component carrier and one or more second component carriers for the terminal apparatus;
broadcasting first system information on the first component carrier;
providing, to the terminal apparatus, second system information corresponding to a component carrier of the one or more second component carriers; and
transmitting a system information update notification in order for the terminal apparatus to determine, by monitoring the system information update notification only in the first component carrier among the plurality of component carriers, whether the first system information is updated, wherein
the second system information corresponding to the component carder of the one or more second component carriers is used in a connected state and is updated using dedicated radio resource control signaling.

* * * * *